(12) United States Patent
Nam et al.

(10) Patent No.: US 11,231,617 B2
(45) Date of Patent: Jan. 25, 2022

(54) BACKLIGHT UNIT AND DISPLAY DEVICE INCLUDING THE SAME

(71) Applicant: Samsung Display Co., LTD., Yongin-si (KR)

(72) Inventors: Ji Eun Nam, Seoul (KR); Do Hun Kim, Suwon-si (KR); Ju Youn Son, Cheonan-si (KR); Young Keun Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/105,319

(22) Filed: Nov. 25, 2020

(65) Prior Publication Data
US 2021/0223627 A1 Jul. 22, 2021

(30) Foreign Application Priority Data
Jan. 22, 2020 (KR) .......................... 10-2020-0008702

(51) Int. Cl.
*G02F 1/00* (2006.01)
*G02F 1/13357* (2006.01)

(52) U.S. Cl.
CPC .. *G02F 1/133605* (2013.01); *G02F 1/133603* (2013.01); *G02F 1/133606* (2013.01)

(58) Field of Classification Search
CPC . G02F 1/133605; G02F 1/133606; G02F 1/03
See application file for complete search history.

(56) References Cited

U.S. PATENT DOCUMENTS

| 2011/0037740 | A1* | 2/2011 | Yamaguchi | G02B 6/0031 345/204 |
| 2013/0141786 | A1* | 6/2013 | Jeong | G02B 5/30 359/485.01 |
| 2014/0321101 | A1* | 10/2014 | Kadowaki | G02F 1/133617 362/84 |
| 2019/0094616 | A1* | 3/2019 | Kim | G02B 6/0055 |
| 2019/0271884 | A1* | 9/2019 | Watanabe | G02F 1/133611 |
| 2020/0161516 | A1* | 5/2020 | Sasaoka | G02B 5/1876 |
| 2020/0192014 | A1* | 6/2020 | Yoon | G02F 1/133608 |
| 2020/0400999 | A1* | 12/2020 | Chang | G02F 1/133605 |
| 2021/0074693 | A1* | 3/2021 | Sim | H01L 25/13 |
| 2021/0088852 | A1* | 3/2021 | Kim | G02F 1/133608 |

FOREIGN PATENT DOCUMENTS

KR 101397697 B1 5/2014

* cited by examiner

*Primary Examiner* — Gerald J Sufleta, II
(74) *Attorney, Agent, or Firm* — Cantor Colburn LLP

(57) ABSTRACT

A backlight unit includes a central area and a peripheral area disposed outside the central area, the backlight unit includes a bottom chassis, a plurality of light sources disposed on a surface of the bottom chassis, a reflective layer disposed on the surface of the bottom chassis, where a plurality of light source insertion holes and a plurality of opening patterns are defined through the reflective layer, and a light correction material layer disposed between the bottom chassis and the reflective layer in the peripheral area, where the light source insertion holes expose the light sources, respectively, and the opening patterns are disposed in the peripheral area to expose at least a portion of the light correction material layer in a thickness direction.

17 Claims, 15 Drawing Sheets

420S : 420S1,420S2,420S3,420S4

BACKLIGHT UNIT AND DISPLAY DEVICE INCLUDING THE SAME

This application claims priority to Korean Patent Application No. 10-2020-0008702, filed on Jan. 22, 2020, and all the benefits accruing therefrom under 35 U.S.C. § 119, the content of which in its entirety is herein incorporated by reference.

BACKGROUND

1. Field

The disclosure relates to a backlight unit and a display device including the backlight unit.

2. Description of the Related Art

A liquid crystal display device may receive light from a backlight unit to display an image. The backlight unit typically includes a plurality of light sources. Light emitted from the light source may be incident on a liquid crystal display panel through an optical film or the like.

Recently, studies have been conducted to apply a wavelength filter layer in order to improve the uniformity of luminance of a liquid crystal display device for improved image quality and to reduce a thickness of the liquid crystal display device. The wavelength filter layer may be formed by repeatedly stacking a plurality of refractive layers having different refractive indexes from each other. By changing the transmittance according to the wavelength region and/or the incident angle of light incident on the wavelength filter layer, to the wavelength filter layer may diffuse the light.

In a case of an edge type backlight unit in which a light source is located on the side of the display panel, a diffusion plate is typically disposed above a light guide plate. On the other hand, in a case of a direct type backlight unit in which a light source is disposed below the display panel, the diffusion plate may directly face the light source.

SUMMARY

Embodiments of the disclosure provide a backlight unit in which the density of a light correction material layer is adjusted using the arrangement density of a plurality of opening patterns formed in a reflective layer.

Embodiments of the disclosure also provide a display device including a backlight unit in which the density of a light correction material layer is adjusted using the arrangement density of a plurality of opening patterns formed in a reflective layer.

According to an embodiment of the discloser, a backlight unit, including a central area and a peripheral area disposed outside the central area, includes a bottom chassis, a plurality of light sources disposed on a surface of the bottom chassis, a reflective layer disposed on the surface of the bottom chassis, where a plurality of light source insertion holes and a plurality of opening patterns are defined through the reflective layer, and a light correction material layer disposed between the bottom chassis and the reflective layer in the peripheral area, where the light source insertion holes expose the light sources, respectively, and the opening patterns are disposed in the peripheral area to expose at least a portion of the light correction material layer in a thickness direction.

In an exemplary embodiment, the opening patterns may be spaced apart from each other, and an arrangement density of the opening patterns may decrease in a direction from the peripheral area toward the central area.

In an exemplary embodiment, a planar area of each of the opening patterns may decrease in the direction from the peripheral area toward the central area, and a planar area of the light correction material layer exposed by the opening patterns may decrease in the direction from the peripheral area toward the central area.

In an exemplary embodiment, each of the light sources may emit light in a first wavelength range, and the light correction material layer may include a material which absorbs light of the first wavelength range.

In an exemplary embodiment, each of the light sources may emit light in a first wavelength range, and the light correction material layer may include a material which converts light of the first wavelength range into light in a second wavelength range different from the first wavelength range.

In an exemplary embodiment, the light source may emit blue light, and the light correction material layer may include a material which converts the blue light into yellow light.

In an exemplary embodiment, the opening patterns and the light source insertion holes may be spaced apart from each other.

In an exemplary embodiment, each of the light source insertion holes may surround a corresponding light source of the light sources, and a thickness of the reflective layer may be smaller than a thickness of the light sources.

In an exemplary embodiment, the light source insertion holes include a first light source insertion hole disposed in the peripheral area, and a second light source insertion hole disposed in the central area, and the first light source insertion hole may expose at least a portion of the light correction material layer.

In an exemplary embodiment, the backlight unit may further include a substrate disposed between the bottom chassis and the reflective layer, where the substrate may include a first surface facing the reflective layer and a second surface opposite to the first surface, and the light sources may be disposed on the first surface of the substrate.

In an exemplary embodiment, the light correction material layer may be disposed on a portion of the first surface of the substrate which is exposed by the light sources in the peripheral area.

In an exemplary embodiment, the light correction material layer may not overlap the light sources in a plan view.

In an exemplary embodiment, the light correction material layer may be interposed between the bottom chassis and the substrate, and the substrate may include a light transmissive material.

In an exemplary embodiment, the light sources disposed in the peripheral area may overlap at least a portion of the light correction material layer in the plan view.

In an exemplary embodiment, the backlight unit may further include a diffusion plate spaced apart from the light sources in a thickness direction on the surface of the bottom chassis.

According to an embodiment of the discloser, a display device includes a backlight unit including a central area and a peripheral area surrounding the central area, where the backlight unit includes: a bottom chassis, a light correction material layer disposed on a surface of the bottom chassis in the peripheral area, a plurality of light sources disposed on the surface of the bottom chassis, and a reflective layer disposed on the light correction material layer, where a plurality of light source insertion holes and a plurality of opening patterns spaced apart from the light source insertion holes are defined through the reflective layer; and a display panel disposed above the backlight unit, where the light source insertion holes expose the light sources, respectively, and the opening patterns are disposed in the peripheral area to expose at least a portion of the light correction material layer in a thickness direction.

In an exemplary embodiment, the opening patterns may be spaced apart from each other, and an arrangement density of the opening patterns may decrease in a direction from the peripheral area toward the central area.

In an exemplary embodiment, each of the light sources may emit light in a first wavelength range, and the light correction material layer includes a material which converts light in the first wavelength range into light in a second wavelength range different from the first wavelength range.

In an exemplary embodiment, the light source may emit blue light, and the light correction material layer may include a material which converts the blue light into yellow light.

In an exemplary embodiment, each of the light source insertion holes may surround a corresponding light source of the light sources, and wherein a thickness of the reflective layer is smaller than a thickness of the light sources.

In exemplary embodiments of a backlight unit, the density of a light correction material layer exposed in a thickness direction of a display device is adjusted by applying the light correction material layer to a lower portion of a reflective layer with opening patterns and adjusting the arrangement density of the opening patterns. Thus, a manufacturing process may be efficient or effectively simplified since redesign of the arrangement density of the light correction material layer according to a material of the reflective layer or coating equipment for patterning the light correction material layer may be omitted.

BRIEF DESCRIPTION OF THE DRAWINGS

The above and other features of the disclosure will become more apparent by describing in detail exemplary embodiments thereof with reference to the attached drawings, in which.

DETAILED DESCRIPTION

Figure 1:
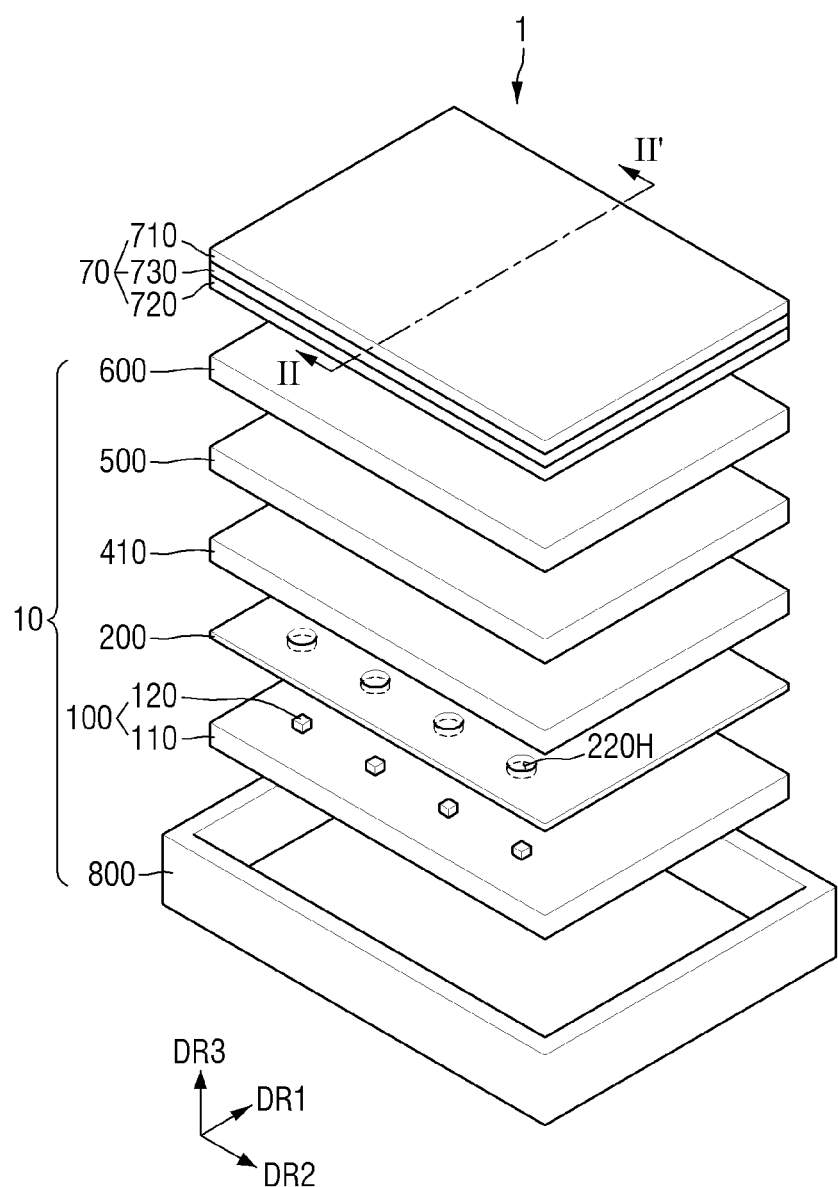
FIG. 1 is an exploded perspective view of a display device according to an exemplary embodiment.

The invention will now be described more fully hereinafter with reference to the accompanying drawings, in which various embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," etc. may be used herein to describe various elements, these elements should not be limited by these terms. These terms are only used to distinguish one element from another element. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element's as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the disclosure will be described in detail with reference to the accompanying drawings.

Figure 2:
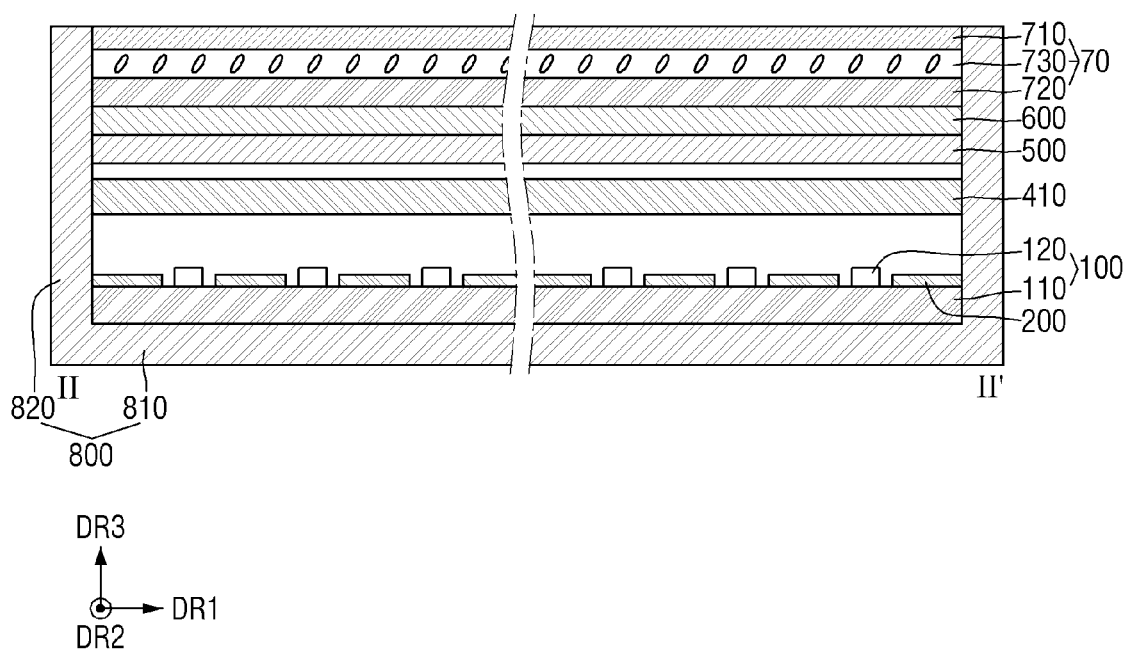
FIG. 2 is a cross-sectional view taken along line II-II' of FIG. 1.

FIG. 1 is an exploded perspective view of a display device according to an exemplary embodiment. FIG. 2 is a cross-sectional view taken along line II-II' of FIG. 1.

Herein, a first direction DR1, a second direction DR2, and a third direction DR3 may be defined as shown in the drawing. The first direction DR1 and the second direction DR2 may be directions perpendicular to each other on a plane. The third direction DR3 may be a direction perpendicular to the plane defined by the first direction DR1 and the second direction DR2. The third direction DR3 is perpendicular to each of the first direction DR1 and the second direction DR2. Herein, the third direction DR3 may be a thickness direction of a display device 1.

Unless otherwise mentioned in the embodiments described therein, one side of the first direction DR1 refers to an upward direction in a plan view, the other side of the first direction DR1 refers to a downward direction in a plan view, one side of the second direction DR2 refers to a right direction in a plan view, and the other side of the second direction DR2 refers to a left direction in a plan view. Further, the term "above" refers to a display direction toward one side of the third direction DR3, and likewise, the term "upper surface" refers to a surface toward one side of the third direction DR3. Furthermore, the term "below" refers to an opposite direction of the display direction toward the other side of the third direction DR3, and the term "lower surface" refers to a surface toward the other side of the third direction DR3.

Referring to FIGS. 1 and 2, an exemplary embodiment of the display device 1 is a device for displaying an image or a video. Such an embodiment of the display device 1 may include various electronic devices such as a television, an external billboard, a monitor, a personal computer ("PC"), a laptop computer, a tablet PC, a smartphone, a car navigation unit, a camera, a center information display ("CID") provided in a vehicle, a wristwatch-type electronic device, a personal digital assistant ("PDA"), a portable multimedia player ("PMP"), a game console, and the like. These are merely exemplary, and the display device 1 may also be applied to other electronic devices without departing from the teaching therein.

In an exemplary embodiment, as shown in FIG. 1, the display device 1 may have a rectangular shape including long and short sides such that the side in the second direction DR2 is longer than the side in the first direction DR1 in a plan view. A corner portion where the long side and the short side of the display device 1 meet may have a right angle in a plan view. However, the disclosure is not limited thereto, and alternatively, the corner portion may be rounded to have a curved shape. The planar shape of the display device 1 is not limited thereto, but may be modified to have one of various shapes such as a square, a circle, an ellipse or other polygons. A display surface of the display device 1 may be disposed on one side of the third direction DR3 which is the thickness direction.

The display device 1 may include a display panel 70 and a backlight unit 10 disposed below the display panel 70 to provide light to the display panel 70.

The display panel 70 may display a screen by receiving the light emitted from the backlight unit 10. The display panel 70 may be a light receiving display panel, for example, a liquid crystal display panel, an electrowetting display panel, an electrophoretic display panel, or the like. Hereinafter, for convenience of description, exemplary embodiments where the display panel 70 is a liquid crystal panel ("LCD") will be described in detail, but not being limited thereto. The features of the exemplary embodiments described herein may be similarly applied to other embodiments where the display panel 70 is a different type of display panel.

In an exemplary embodiment, the display panel 70 may include an upper substrate 710, a lower substrate 720 facing the upper substrate 710, and a liquid crystal layer 730 disposed therebetween. The display panel 70 may further include a plurality of pixels. The pixels of the display panel 70 may be arranged in a matrix form. The display panel 70 may include a switching element and a pixel electrode provided for each pixel, and a common electrode facing the pixel electrode. The switching element and the pixel electrode may be disposed on the lower substrate 720, and the common electrode may be disposed on the upper substrate 710. However, the disclosure is not limited thereto, and alternatively, the common electrode may also be disposed on the lower substrate 720. A sealing member 940 may be disposed on the edges of the upper substrate 710 and the lower substrate 720 to confine the liquid crystal molecules of the liquid crystal layer 730.

The backlight unit 10 is disposed below the display panel 70. The backlight unit 10 may be disposed to overlap the display panel 70 in the third direction DR3.

In an exemplary embodiment, the backlight unit 10 may include a bottom chassis 800, a light source member 100 accommodated in the bottom chassis 800, a reflective layer 200, a light correction material layer 300 (see FIG. 5), and a diffusion plate 410, a wavelength conversion layer 500, and an optical sheet 600.

The light source member 100 may include a first substrate 110 and a plurality of light sources 120 disposed on the first substrate 110.

The light sources 120 emit light to be provided to the display panel 70. Each of the light sources 120 may be a point light source. Each of the light sources 120 may be provided in a chip form. In an exemplary embodiment, each of the light sources 120 may be a light emitting diode ("LED") chip, but is not limited thereto. The light emission direction of each light source 120 may be substantially an upward direction as shown in FIG. 1.

The light sources 120 may emit light in a specific wavelength range. In one exemplary embodiment, for example, the light source 120 may emit blue light in a wavelength range of about 420 nanometers (nm) to about 470 nm. In an alternative exemplary embodiment, the light source 120 may emit light having two or more peak wavelengths. In one exemplary embodiment, for example, the light source 120 may emit near-ultraviolet light and blue light.

The light emitted from the light source 120 may be incident on the diffusion plate 410 disposed thereabove.

The reflective layer 200 may be disposed to surround at least one light source 120 on the first substrate 110. The reflective layer 200 may reflect at least a portion of the light from the light source 120, which travels upward but is reflected toward the reflective layer 200, and allow the light reflected thereto to re-enter the diffusion plate 410 disposed thereabove.

The diffusion plate 410 may be disposed above the light source member 100. The diffusion plate 410 may be spaced apart from the light source member 100 in the third direction DR3. In such an embodiment where the diffusion plate 410 is spaced apart from the light source 120 of the light source member 100 by a predetermined distance, the light emitted from the light sources 120 may be dispersed to prevent the light from being concentrated. The diffusion plate 410 serves to diffuse the light emitted from the light sources 120 toward the display panel 70 and to provide the light emitted from the light sources 120 to the display panel 70 with a more uniform luminance.

The diffusion plate 410 may include a light transmissive material. The diffusion plate 400 may include at least one material selected from polymethyl methacrylate ("PMMA"), polystyrene ("PS"), polypropylene ("PP"), polyethylene terephthalate ("PET"), polycarbonate ("PC"), and the like.

The wavelength conversion layer 500 may be disposed on the diffusion plate 410. The wavelength conversion layer 500 serves to convert the wavelength of at least a portion of light emitted from the diffusion plate 410 toward the display panel 70.

The wavelength conversion layer 500 may include a binder layer and wavelength conversion particles dispersed in the binder layer. In such an embodiment, the wavelength conversion layer 500 may further include scattering particles dispersed in the binder layer in addition to the wavelength conversion particles.

The binder layer, which is a medium in which the wavelength conversion particles are dispersed, may include or be formed of various resin compositions. However, the disclosure is not limited thereto, and a medium capable of dispersing and arranging the wavelength conversion particles and/or scattering particles may be referred to as a binder layer regardless of its name, additional other functions, constituent materials, and the like.

The wavelength converting particle is a particle that converts a wavelength of incident light, and may be, for example, a quantum dot (also referred to as QD), a fluorescent material or a phosphorescent material. Hereinafter, for convenience of description, exemplary embodiments where wavelength conversion particles 222 are quantum dots will be described in detail, but the disclosure is not limited thereto.

The quantum dot is a material having a crystal structure of a few nanometers in size, consisting of hundreds to thousands of atoms, and may exhibit a quantum confinement effect in which an energy band gap increases due to its small size. When light with a wavelength having higher energy than the band gap is incident on the quantum dot, the quantum dot may enter into an excited state by absorbing the light, and fall to a ground state while emitting light in a specific wavelength. The emitted light of the specific wavelength has a value corresponding to the band gap. Accordingly, the light emission characteristics of the quantum dot due to the quantum confinement effect may be adjusted by adjusting the size and composition thereof.

In one exemplary embodiment, for example, the quantum dot may include at least one selected from Group II-VI compounds, Group II-V compounds, Group III-VI compounds, Group III-V compounds, Group IV-VI compounds, Group compounds, Group II-IV-VI compounds and Group II-IV-V compounds.

The QD may include a core and a shell that overcoats the core. The core may be at least one selected from, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si and Ge, but is not limited thereto. The shell may include at least one selected from, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe and PbTe, but is not limited thereto.

The wavelength conversion particle may include a plurality of wavelength conversion particles capable of converting incident light into light with different wavelengths. In one exemplary embodiment, for example, the wavelength conversion particles may include a first wavelength conversion particle which converts incident light in a specific wavelength into light of a first wavelength and emits the converted light, and a second wavelength conversion particle which converts incident light of a specific wavelength into light of a second wavelength and emits the converted light. In an exemplary embodiment, the light emitted from the light sources 120 and incident on the wavelength conversion particles may be light of a blue wavelength, the first wavelength may be a green wavelength, and the second wavelength may be a red wavelength. In one exemplary embodiment, for example, the blue wavelength may be a wavelength having a peak in a range of about 420 nm to about 470 nm, the green wavelength may be a wavelength having a peak in a range of about 520 nm to about 570 nm, and the red wavelength may be a wavelength having a peak in a range of about 620 nm to about 670 nm. However, the blue, green, and red wavelengths are not limited thereto, and will be understood to include all wavelength ranges that can be perceived as blue, green, and red lights in the art.

An optical sheet 600 may be disposed on the wavelength conversion layer 500. The optical sheet 600 may perform optical functions such as light collection, refraction, diffusion, reflection, polarization and phase delay on incident light. In an exemplary embodiment, the optical sheet 600 may include a prism sheet, a microlens sheet, a lenticular sheet, a diffusion sheet, a polarizing sheet, a reflective polarizing sheet, a retardation sheet, a protective sheet or the like. The optical sheet 600 may have a multi-layer structure including a plurality of layers having a plurality of optical functions, which are integrally combined. In an exemplary embodiment, the optical sheet 600 may include a structure in which a first prism sheet, a second prism sheet, and a reflective polarizing sheet are sequentially stacked one on another.

The first prism sheet and the second prism sheet serve to increase the front luminance by refracting a traveling path of light. The reflective polarizing sheet may serve to increase the luminance by transmitting light of a specific polarization and reflecting and recycling light of another polarization.

The bottom chassis 800 may be a housing member of the backlight unit 10 including the light source member 100. The bottom chassis 800 may provide a space in which the light source member 100 and the like may be accommodated.

The bottom chassis 800 may include a bottom portion 810 and a sidewall 820. The sidewall 820 of the bottom chassis 800 may be connected to the bottom portion 810 and bent therefrom in a vertical direction. The light source member 100 is disposed on the bottom portion 810 of the bottom chassis 800. Although not illustrated, the light source member 100, the diffusion plate 410, the wavelength conversion layer 500, and the optical sheet 600 may be fixed to the sidewall 820 of the bottom chassis 800 through a separate adhesive tape. However, the disclosure is not limited thereto, and the above-mentioned members may be mounted on another mounting structure, or may be mounted or attached on a mold frame provided in the bottom chassis 800.

Hereinafter, the light source member 100, the reflective layer 200, the light correction material layer 300, and the bottom chassis 800 will be described in detail.

Figure 3:
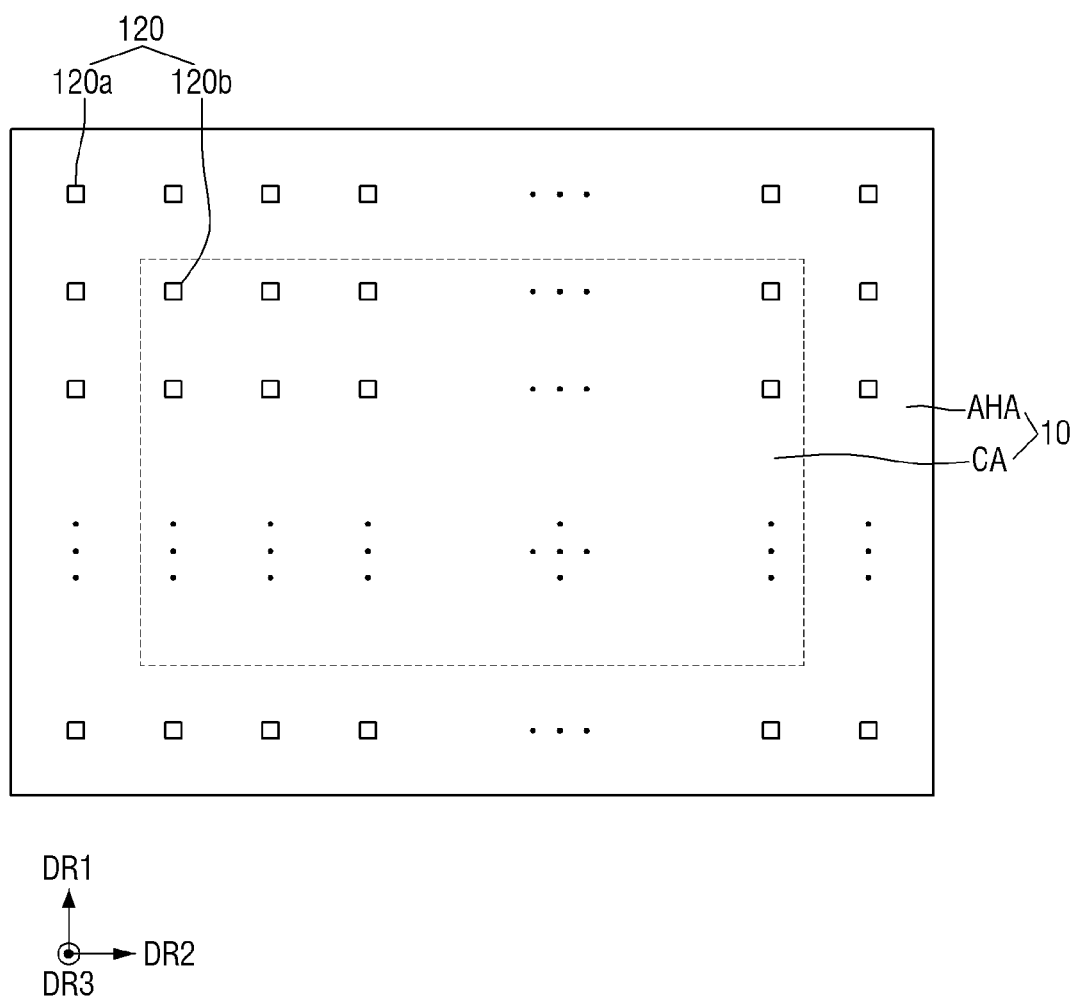
FIG. 3 is a plan view of a backlight unit according to an exemplary embodiment.

FIG. 3 is a plan view of a backlight unit according to an exemplary embodiment. FIG. 3 is a schematic view showing only a plurality of light sources of the backlight unit for convenience of illustration and description.

Referring to FIG. 3, an exemplary embodiment of the backlight unit 10 may include a central area CA and a peripheral area AHA. The central area CA may have a rectangular shape in a plan view similar to the overall shape of the backlight unit 10. The peripheral area AHA may be arranged to completely or partially surround the central area CA at the edges (or outside) of the central area CA in a plan view. In an exemplary embodiment, the peripheral area AHA may be disposed to be adjacent to four sides of the central area CA.

The plurality of light sources 120 may be disposed in the central area CA and the peripheral area AHA. The plurality of light sources 120 may include a first light source 120a disposed in the peripheral area AHA and a second light source 120b disposed in the central area CA. The first light source 120a and the second light source 120b may be substantially the same as each other.

The plurality of light sources 120 may be spaced apart from each other along the first direction DR1 and the second direction DR2 in a plan view and may be disposed at predetermined intervals. Here, it will be understood that the plurality of light sources 120 are spaced apart from each other means that light emitting portions of the plurality of light sources 120 are spaced apart from each other. Accordingly, not only when light source packages constituting the respective light sources 120 are spaced apart from each other but also when the light source packages of the respective light sources 120 are adjacent or connected to each other, if the light emitting portions of the plurality of light sources 120 are spaced apart, the plurality of light sources 120 are construed as being spaced apart. In an exemplary embodiment, as shown in FIG. 3, the arrangement directions of the light sources 120 are the same as the extending directions of the long and short sides of the display device, but the disclosure is not limited thereto. The arrangement direction of the light sources 120 and the extending direction of the long/short side of the display device 1 may be variously modified, e.g., inclined at a predetermined inclination. In an exemplary embodiment, as shown in FIG. 3, each row and each column of an array of the light sources 120 extend in a linear manner, but the disclosure is not limited thereto. Alternatively, the light sources 120 may be arranged in a way such that neighboring rows and/or columns cross each other or alternately disposed with each other.

Unless otherwise mentioned, in FIG. 3, a distance between two light sources 120 in the first direction DR1 is defined as the closest distance between the two sides, which face each other in the first direction DR1, of the two light sources 120 adjacent to each other in the first direction DR1, and a distance between two light sources 120 in the second direction DR2 is defined as the closest distance between the two sides, which face each other in the second direction DR2, of the two light sources 120 adjacent to each other in the second direction DR2.

Each light source 120 may have a square shape. Hereinafter, for convenience of description, exemplary embodiments where the planar shape of each light source 120 has a square shape will be described in detail, but the planar shape of each light source 120 is not limited thereto. Alternatively, the planar shape of each light source 120 may have other shapes such as a rectangle, a circle, and the like.

In the light sources 120, the distance between two adjacent light sources 120 in the first direction DR1 may be the same as the distance between two adjacent light sources 120 in the second direction DR2 as shown in FIG. 3. However, the disclosure is not limited thereto, and alternatively, the distance between the two adjacent light sources 120 in the first direction DR1 and the distance between the two adjacent light sources 120 in the second direction DR2 may be different from each other.

Figure 4:
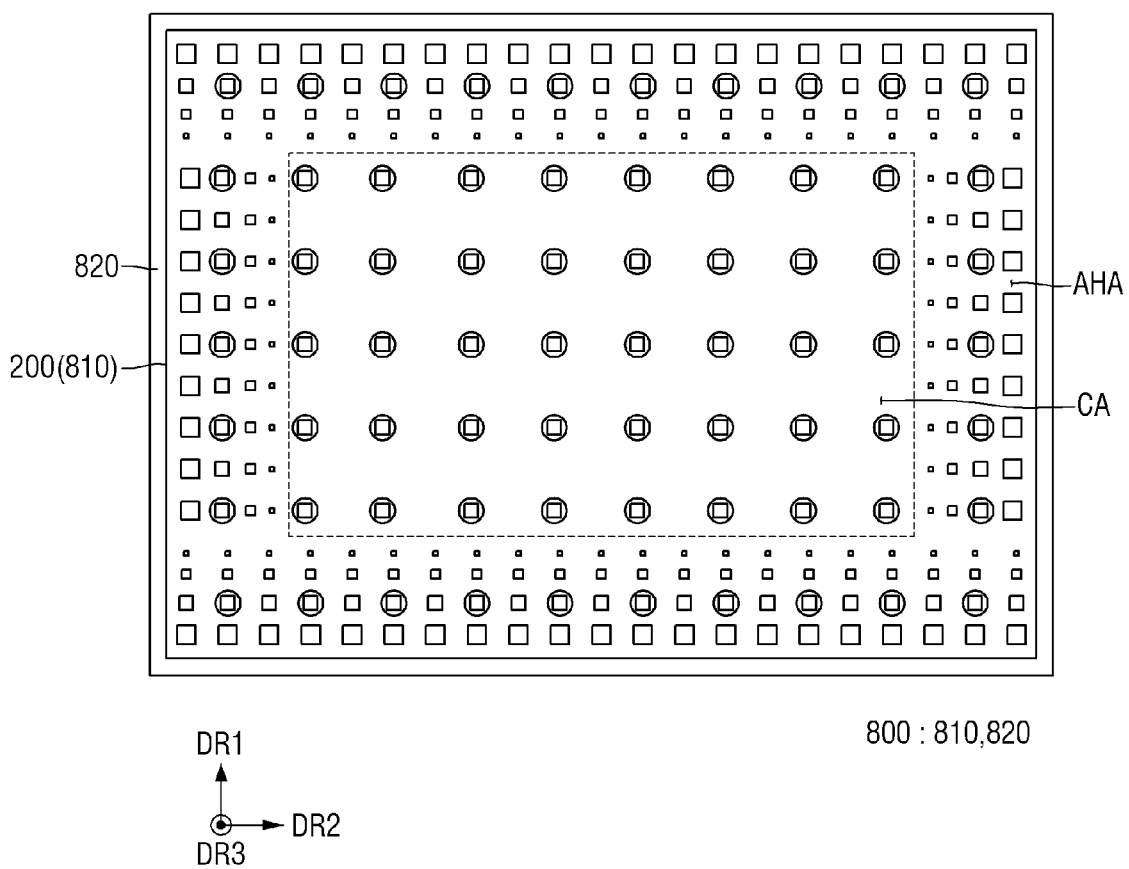
FIG. 4 is a plan view illustrating a relative positional relationship between a bottom chassis and a reflective layer according to an exemplary embodiment.
Figure 5:
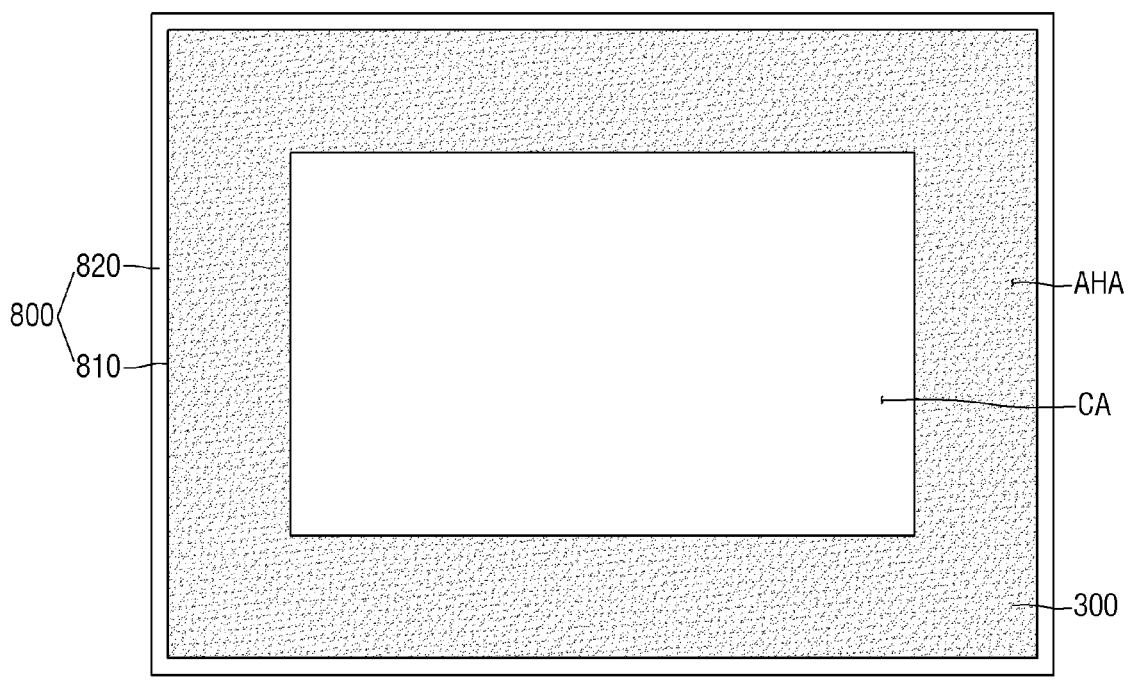
FIG. 5 is a plan view illustrating a relative positional relationship between a bottom chassis and a light correction material layer according to an exemplary embodiment.
Figure 5:
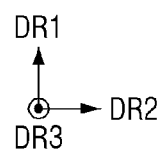
Figure 6:
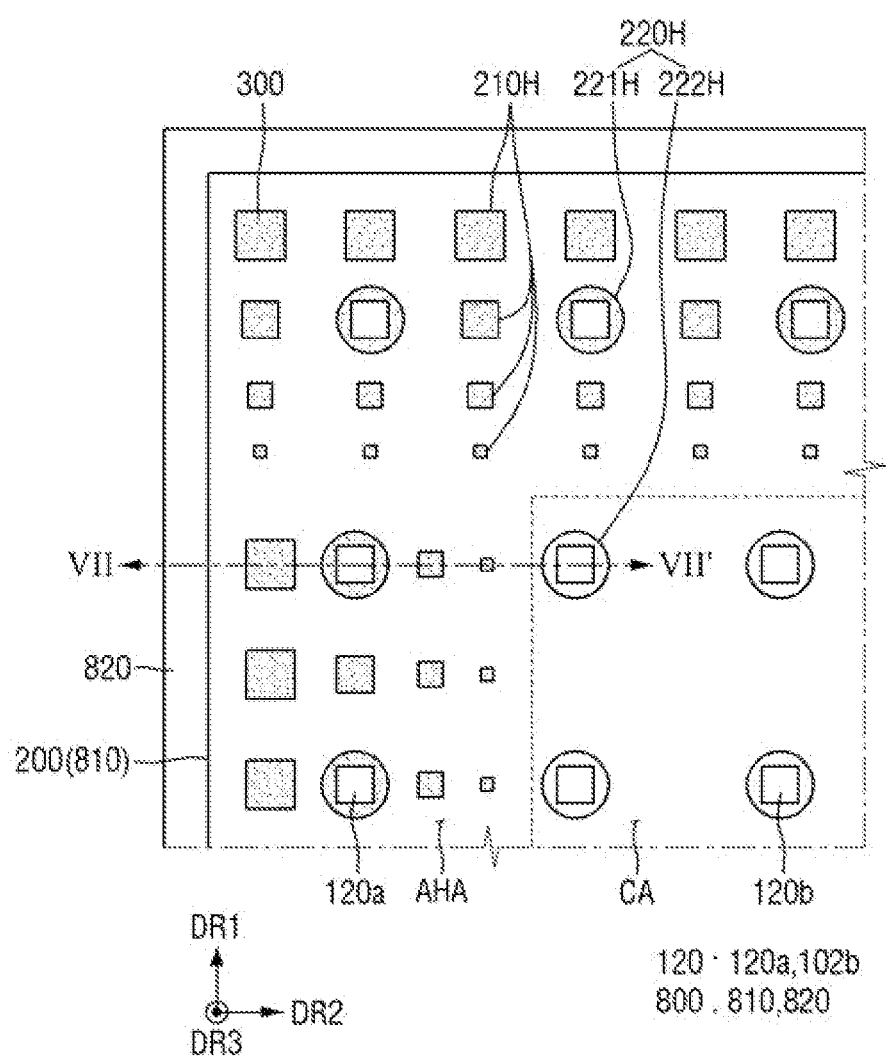
FIG. 6 is a plan view illustrating a relative positional relationship between a bottom chassis, a reflective layer and light sources.

FIG. 4 is a plan view illustrating a relative positional relationship between a bottom chassis and a reflective layer according to an exemplary embodiment. FIG. 5 is a plan view illustrating a relative positional relationship between a bottom chassis and a light correction material layer according to an exemplary embodiment. FIG. 6 is a plan view illustrating a relative positional relationship between a bottom chassis, a reflective layer, and light sources.

Referring to FIGS. 4 to 6, in an exemplary embodiment, the reflective layer 200 may be disposed on the bottom portion 810 of the bottom chassis 800.

The reflective layer 200 may have a planar shape that is substantially similar to that of the bottom portion 810 of the bottom chassis 800. In one exemplary embodiment, for example, when the bottom portion 810 has a rectangular planar shape, the reflective layer 200 may also have a rectangular planar shape similar thereto. In a plan view, the size of the reflective layer 200 and the size of the bottom portion 810 may have substantially the same as each other, but the disclosure is not limited thereto.

In an exemplary embodiment, a plurality of opening patterns 210H and a plurality of light source insertion holes 220H spaced apart from the plurality of opening patterns 210H are defined through the reflective layer 200.

The plurality of opening patterns 210H may be defined or formed at the edges of the reflective layer 200. That is, the plurality of opening patterns 210H may be disposed in the peripheral area AHA. The opening patterns 210H may be patterned at the edges of the reflective layer 200 to completely penetrate the reflective layer 200 in the third direction DR3 (or thickness direction).

The height (or depth) of the plurality of opening patterns 210H may be equal to the height (or thickness) of the reflective layer 200.

The opening patterns 210H may be spaced apart from each other at predetermined intervals. The plurality of opening patterns 210H may be formed to be spaced apart at predetermined intervals along the first direction DR1 and/or the second direction DR2.

The arrangement density of the opening patterns 210H may be nonuniform, that is, differ depending on the area. In one exemplary embodiment, for example, the arrangement density of the opening patterns 210H may be reduced in a region adjacent to the central area CA having a high proportion of white light as monochromatic light (blue light) emitted from the light sources 120 is recycled, and the arrangement density of the opening patterns 210H may be increased in an edge portion of the peripheral area AHA where the proportion of monochromatic light (blue light) increases due to a relatively low proportion of white light. In an exemplary embodiment, the opening patterns 210H are disposed in the peripheral area AHA, and the arrangement density of the opening patterns 210H may decrease as being toward the central area CA from the peripheral area AHA.

In a plan view, the planar shape of the opening pattern 210H may be a square. The planar areas of the opening patterns 210H may not be the same as each other. The planar area of the opening pattern 210H may decrease from the peripheral area AHA as being toward the central area CA. However, the disclosure is not limited thereto, and the planar shape and/or area of each opening pattern 210H may be variously modified. In one exemplary embodiment, for example, although the opening patterns 210H have the same planar area, the arrangement density may be adjusted by decreasing the number of the opening patterns 210H arranged as it goes from the peripheral area AHA toward the central area CA. In an alternative exemplary embodiment, the planar shape of each opening pattern 210H may have other shapes such as a circle, an ellipse, and a rectangle.

The plurality of light source insertion holes 220H may be defined or formed at the center and the edge of the reflective layer 200. The light source insertion hole 220H may be formed completely through the reflective layer 200 in the third direction DR3 (or thickness direction). The light source insertion hole 220H may have a cylindrical shape having a predetermined width and a predetermined height (or depth).

The height (or depth) of the light source insertion hole 220H may be the same as the height (or thickness) of the reflective layer 200.

The plurality of light source insertion holes 220H may have a circular shape with the same area in a plan view. However, the disclosure is not limited thereto, and the planar shape of the light source insertion holes 220H may have other shapes such as a square, an ellipse and a rectangle, or the sizes of the respective light source insertion holes 220H in a plan view may be different from each other.

The light source insertion holes 220H may be spaced apart at predetermined intervals. The light source insertion holes 220H may be spaced apart at predetermined intervals along the first direction DR1 and the second direction DR2. The reflective layer 200 may be disposed such that each light source insertion hole 220H exposes a corresponding light source 120 in the third direction DR3 (or thickness direction). In an exemplary embodiment, each light source insertion hole 220H may correspond to one light source 120 on a one-to-one basis.

Each light source insertion hole 220H defined or formed in the reflective layer 200 may be disposed to surround at least one light source 120. The light source insertion hole 220H may completely expose the light source 120 in the third direction DR3. In an exemplary embodiment, the planar area of the light source insertion hole 220H may be larger than the planar area of the corresponding light source 120 to completely expose the light source 120 toward the display surface.

In an exemplary embodiment, an interval between two light source insertion holes 220H adjacent to each other in the first direction DR1 may be equal to an interval between two light source insertion holes 220H adjacent in the second direction DR2. However, the disclosure is not limited thereto, and alternatively, the interval between two light source insertion holes 220H adjacent to each other in the first direction DR1 may be different from the interval between two light source insertion holes 220H adjacent in the second direction DR2 according to the shape of the individual light source insertion holes 220H.

The light source insertion holes 220H may include a first light source insertion hole 221H disposed in the peripheral area AHA and a second light source insertion hole 222H disposed in the central area CA. In the peripheral area, the first light source insertion hole 221H and the opening pattern 210H may be spaced apart from each other.

The first light source insertion hole 221H may expose the first light source 120a disposed in the peripheral area AHA in the third direction DR3. The first light source insertion hole 221H may expose at least a portion of the light correction material layer 300 (to be described later) disposed to surround the first light source 120a in the third direction DR3.

The light correction material layer 300 may be disposed on the bottom portion 810 of the bottom chassis 800. The light correction material layer 300 may be disposed entirely in the peripheral area AHA on the bottom portion 810. The light correction material layer 300 may be disposed between the bottom portion 810 and the reflective layer 200 in the peripheral area AHA.

A portion of the light correction material layer 300 may be exposed in the third direction DR3 by the opening pattern 210H of the reflective layer 200. In a plan view, the light correction material layer 300 may be exposed in a pattern shape of the opening patterns 210H in the third direction DR3 in the peripheral area AHA by the plurality of opening patterns 210H.

The planar area of the light correction material layer 300 exposed in the third direction DR3 by the opening pattern 210H may be the same as the planar area of the opening pattern 210H. That is, the density of the light correction material layer 300 exposed in the third direction DR3 may be controlled by the arrangement density of the opening patterns 210H. In an exemplary embodiment, the planar area of the light correction material layer 300 exposed by the opening pattern 210H in the third direction DR3 may decrease from the peripheral area AHA as being toward the central area CA. However, the disclosure is not limited thereto, and alternatively, the area and shape of the light correction material layer 300 exposed by the opening patterns 210H formed on the reflective layer 200 may be variously modified by the planar shapes of the opening patterns 210H.

The light correction material layer 300 disposed adjacent to the first light source 120a disposed in the peripheral area AHA in a plan view may be exposed in the third direction DR3 by the first light source insertion hole 221H. The light correction material layer 300 exposed by the plurality of first light source insertion holes 221H may have a shape obtained by excluding the planar shape of the first light sources 120a from the planar shape of the first light source insertion holes 221H in a plan view. That is, the planar area of the light correction material layer 300 exposed by the plurality of first light source insertion holes 221H may be an area obtained by excluding the planar area of the first light sources 120a from the planar area of the first light source insertion holes 221H.

The light correction material layer 300 is disposed in the peripheral area AHA may include a material that absorbs light in a first wavelength range emitted from the light sources 120 or converts the light in the first wavelength range into light in a second wavelength range different from the first wavelength range. In such an embodiment where the light correction material layer 300 is disposed in the peripheral area AHA and absorbs light in a first wavelength range emitted from the light sources 120 or converts the light in the first wavelength range into light in a second wavelength range different from the first wavelength range, such that color reproducibility is effectively prevented from decreasing due to an increase in the amount of light in the first wavelength range in the peripheral area AHA. In one exemplary embodiment, for example, where the light sources 120 emit blue light, a proportion of blue light increases in the peripheral area AHA, such that it appear blue compared to the central area CA. In an exemplary embodiment, the amount of light having a blue wavelength in the peripheral area AHA is reduced to reduce the color difference between the central area CA and the peripheral area AHA, thereby improving the color reproducibility of the display device 1.

In an exemplary embodiment, the color reproducibility may be improved by reducing light of the blue wavelength in the peripheral area AHA to reduce the color difference between the central area CA and the peripheral area AHA. Accordingly, the material forming the light correction material layer 300 may have a property of absorbing light in a first wavelength range emitted from the light sources 120 or converting light in the first wavelength range into light in a second wavelength range different from the first wavelength range.

In an exemplary embodiment, the light correction material layer 300 may include a material that absorbs light in a first wavelength range or blue light. In one exemplary embodiment, for example, the light correction material layer 300 may include or be formed of a yellow pigment having a complementary color relationship with blue. The yellow pigment, which is a complementary color of blue, may absorb blue light. In an alternative exemplary embodiment, the light correction material layer 300 may include or be formed of a black pigment. In such an embodiment, where the light correction material layer 300 includes a material having a property of absorbing light, the luminance may be reduced, but the color difference, which makes the peripheral area AHA appear blue, may be reduced.

In an alternative exemplary embodiment, the light correction material layer 300 may include a material for converting blue light into yellow light. In one exemplary embodiment, for example, the light correction material layer 300 may include a yellow phosphor. The yellow phosphor may be a yttrium-aluminum-gadolinium ("YAG") series phosphor or silicate phosphor, but is not limited thereto.

The light correction material layer 300 absorbs at least a portion of the light incident on the opening patterns 210H of the reflective layer 200 or converts the light into light of a different color, thereby lowering the luminance of blue light in the peripheral area AHA and reducing the color difference for each area to improve color uniformity.

Hereinafter, the light source member 100, the reflective layer 200, the light correction material layer 300, and the bottom chassis 800 will be described in detail.

Figure 7:
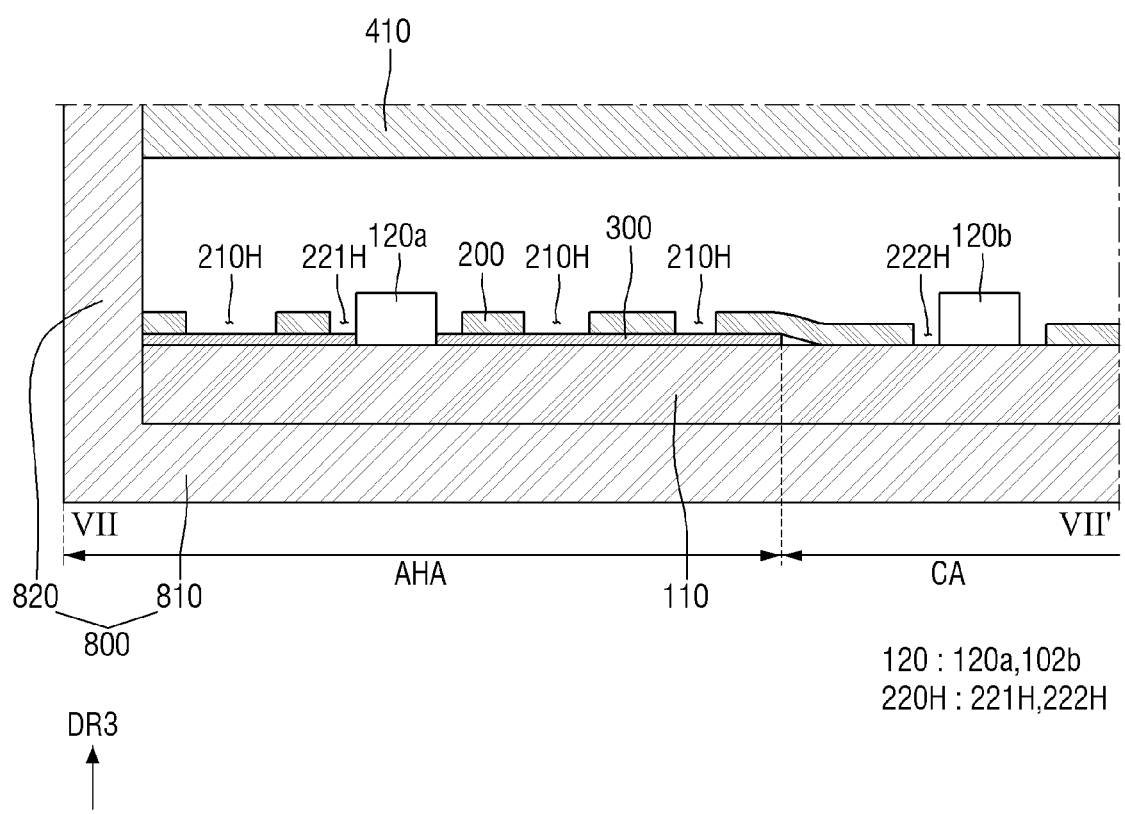
FIG. 7 is a cross-sectional view taken along line VII-VII' of FIG. 6, according to an exemplary embodiment.

FIG. 7 is a cross-sectional view taken along line VII-VII' of FIG. 6, according to an exemplary embodiment.

Referring to FIGS. 4 to 7, an exemplary embodiment of the light source member 100 may include a substrate 110 and a plurality of light sources 120 disposed on the substrate 110.

The substrate 110 may be an insulating substrate or a circuit board. In an exemplary embodiment where the substrate 110 is an insulating substrate, the substrate 110 may include a transparent material such as glass or quartz, or may include a polymer material such as polyimide. In such an embodiment where the substrate 110 is an insulating substrate, the light source member 100 may further include a circuit element layer (not shown) for driving the light sources 120. The circuit element layer may be disposed or formed on a surface of the insulating substrate. Alternatively, the circuit element layer may include or be formed of a printed circuit board or the like and attached or fixed to a surface of the insulating substrate. In an alternative exemplary embodiment where the substrate 110 is a circuit board, the substrate 110 may include or be formed of a printed circuit board. In such an embodiment where the substrate 110 is a printed circuit board, the plurality of light sources 120 mounted on the substrate 110 may be electrically connected to each other.

The substrate 110 may have a planar shape substantially similar to that of the display panel 70. In one exemplary embodiment, for example, where the display panel 70 has a rectangular planar shape, the substrate 110 may also have a rectangular planar shape similar thereto. The substrate 110 and the display panel 70 may have substantially the same size as each other in a plan view, but the disclosure is not limited thereto.

A plurality of light sources 120 may be disposed on a surface of the substrate 110. Each of the light sources 120 may include, but is not limited to, a light emitting diode ("LED"). A diffusion lens (not shown) or the like may be disposed above the light source 120, or the LED may be directly exposed without a separate lens as illustrated in the drawing. In an exemplary embodiment, as shown in FIG. 7, the light emission direction of the light source 120 may be substantially an upward direction.

The light source 120 may emit light in a specific wavelength range. In one exemplary embodiment, for example, the light source 120 may emit blue light having a wavelength range of about 420 nm to about 470 nm. In an alternative exemplary embodiment, the light source 120 may emit light having two or more peak wavelengths. In one exemplary embodiment, for example, the light source 120 may emit near-ultraviolet light and blue light. Hereinafter, for convenience of description, exemplary embodiments in which light emitted from the light source 120 is blue light having a wavelength range of about 420 nm to about 470 nm will be described. However, it will be understood that the following description can be similarly applied even when the wavelength range of the light emitted from the light source 120 is different from the above range.

The reflective layer 200 may be disposed on the substrate 110. The reflective layer 200 may reflect at least a portion of light, which is emitted from the light source 120 but leaked in a lateral direction, and/or a portion of light, which is emitted from the light source 120, enters the display panel 70 then is reflected without being transmitted, to allow it to re-enter the display panel 70.

The reflective layer 200 may include a reflective material. The reflective layer 200 may include at least one material selected from a metal, such as silver (Ag), copper (Cu), aluminum (Al), nickel (Ni), lanthanum (La) and an alloy thereof, indium tin oxide ("ITO"), indium zinc oxide ("IZO"), indium tin-zinc oxide ("ITZO") and the like, but is not limited thereto.

The reflective layer 200 may be disposed to surround the light source 120 in a plan view. In an exemplary embodiment, the light source insertion holes 220H are defined or formed in the reflective layer 200 at positions where the plurality of light sources 120 arranged in a matrix from are disposed, and the reflective layer 200 may be spaced apart from the light sources 120 in a horizontal direction on the substrate 110. The reflective layer 200 may not overlap the light sources 120 on the substrate 110 in the thickness direction.

The light correction material layer 300 may be disposed in the peripheral area AHA. The light correction material layer 300 may be interposed between the substrate 110 and the reflective layer 200 in the peripheral area. The light correction material layer 300 may be disposed on a surface of the substrate 110 on which the first light sources 120a are not disposed in the peripheral area AHA. The light correction material layer 300 may be disposed entirely on the upper surface of the substrate 110 exposed by the first light sources 120a in the peripheral area AHA.

The light correction material layer 300 may include an upper surface, a lower surface and a side surface. The lower surface of the light correction material layer 300 lies on the upper surface of the substrate 110 in the peripheral area AHA. The upper surface of the light correction material layer 300 faces a portion of the lower surface of the reflective layer 200. Each of the upper surface and the lower surface of the light correction material layer 300 may be located on a plane, and the plane on which the upper surface is located and the plane on which the lower surface is located may be substantially parallel to each other. Accordingly, the light correction material layer 300 may have a uniform thickness as a whole. The thickness of the light correction material layer 300 may be smaller than the height of the light source 120.

The reflective layer 200 may expose at least a portion of the light correction material layer 300 in the third direction DR3 in the peripheral area AHA in a plan view. The light correction material layer 300 disposed in the peripheral area AHA may be exposed by the first light source insertion holes 221H and the opening patterns 210H of the reflective layer 200.

The lower surface of the reflective layer 200 is disposed on a surface of the substrate 110 in the central area CA, and is disposed on a surface of the light correction material layer 300 in the peripheral area AHA. The upper surface of the reflective layer 200 faces the lower surface of the diffusion plate 410 disposed thereabove. Each of the upper surface and the lower surface of the reflective layer 200 may be located on a plane, and the plane on which the upper surface is located and the plane on which the lower surface is located may be substantially parallel to each other. Accordingly, the reflective layer 200 may have a uniform thickness as a whole. The thickness of the reflective layer 200 may be smaller than the height of the light source 120.

In an exemplary embodiment of the backlight unit 10, the light correction material layer 300 may be disposed in the peripheral area AHA of the backlight unit 10. The area of the light correction material layer 300 exposed in the third direction DR3 may be adjusted based on the arrangement density of the plurality of opening patterns 210H defined through the reflective layer 200 disposed on the light correction material layer 300. Accordingly, when the light correction material layer 300 is patterned and applied on the upper surface and/or lower surface of the reflective layer 200 according to the material of the reflective layer 200 in a manufacturing process, a process of redesigning the arrangement density of the light correction material layer 300 may be omitted. Thus, redesign of the arrangement density of the light correction material layer 300 according to the material of the reflective layer 200 may be omitted, thereby increasing the manufacturing process efficiency.

Figure 8:
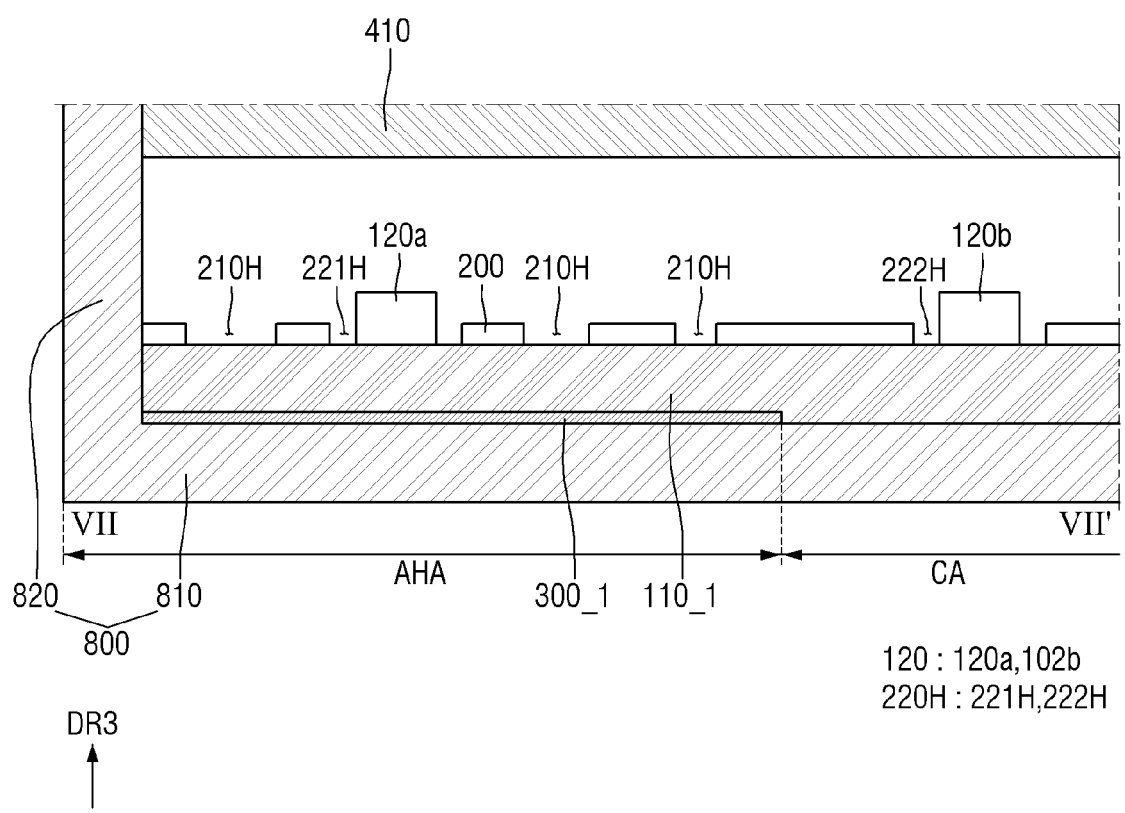
FIG. 8 is a cross-sectional view taken along line VII-VII' of FIG. 6, according to an alternative exemplary embodiment.

FIG. 8 is a cross-sectional view taken along line VII-VII' of FIG. 6, according to an alternative exemplary embodiment.

Referring to FIG. 8, the embodiment of FIG. 8 is substantially the same as the embodiment of FIG. 7 except that the light correction material layer is disposed on the upper surface of the bottom portion of the bottom chassis. The same components as those of the above-described embodiment are denoted by the same reference numerals, and any repetitive detailed description thereof will be omitted.

In an exemplary embodiment, as shown in FIG. 8, a light correction material layer 300_1 may be disposed between the bottom portion 810 and a substrate 110_1 in the peripheral area AHA. The light correction material layer 300_1 may be formed by printing a light correction material on the upper surface of the bottom portion 810.

The light correction material layer 300_1 may be disposed to overlap the reflective layer 200, the first light sources 120a, and the substrate 110_1 disposed in the peripheral area AHA in the thickness direction.

In such an embodiment, the substrate 110_1 may include a transparent material such as glass or quartz. In such an embodiment, since the substrate 110_1 includes a transparent material, even when light of the first wavelength range emitted from the light source 120 travels toward the substrate 110_1, the light may pass through the substrate 110_1 and enter the light correction material layer 300_1. The light may absorb at least a portion of the light entering the light correction material layer 300_1 through the substrate 110_1 or convert at least a portion of the light into light in a second wavelength range different from the first wavelength range. The light converted by the light correction material layer 300_1 may be incident on the display panel 70 after passing through the substrate 110_1 again.

In such an embodiment, the light correction material layer 300_1 is disposed on the upper surface of the bottom portion 810 of the bottom chassis 800 without being disposed on the upper surface of the substrate. Accordingly, the efficiency of the process of applying the light correction material to form the light correction material layer 300_1 may be increased. In such an embodiment, even though the light correction material layer 300_1 is disposed below the substrate 110_1, since the substrate 110_1 includes a transparent material, the color difference between the central area CA and the peripheral area AHA may be reduced.

Hereinafter, an alternative exemplary embodiment of the backlight unit will be described in detail. In the following embodiment, the same components as those of the above-described embodiment are denoted by the same reference numerals, any repetitive detailed description thereof will be omitted or simplified.

Figure 9:
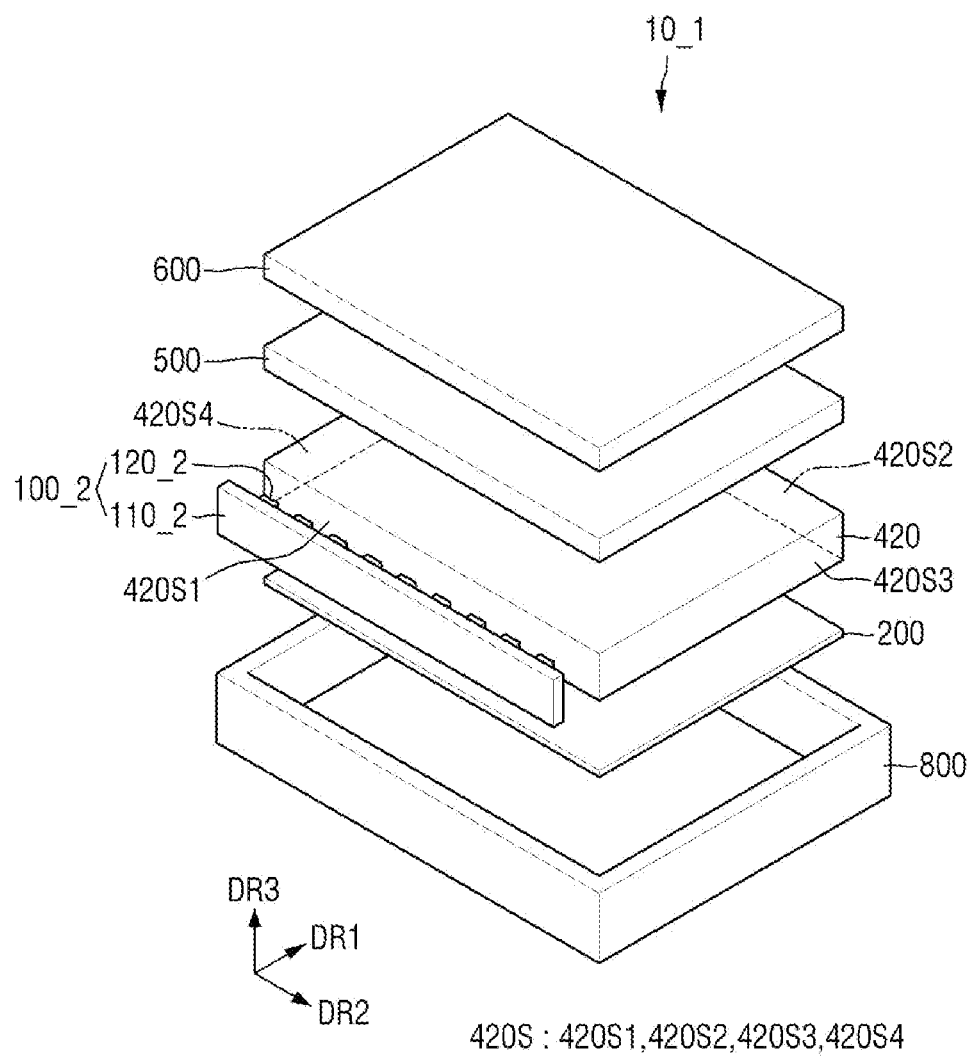
FIG. 9 is an exploded perspective view of a backlight unit according to an alternative exemplary embodiment.
Figure 10:
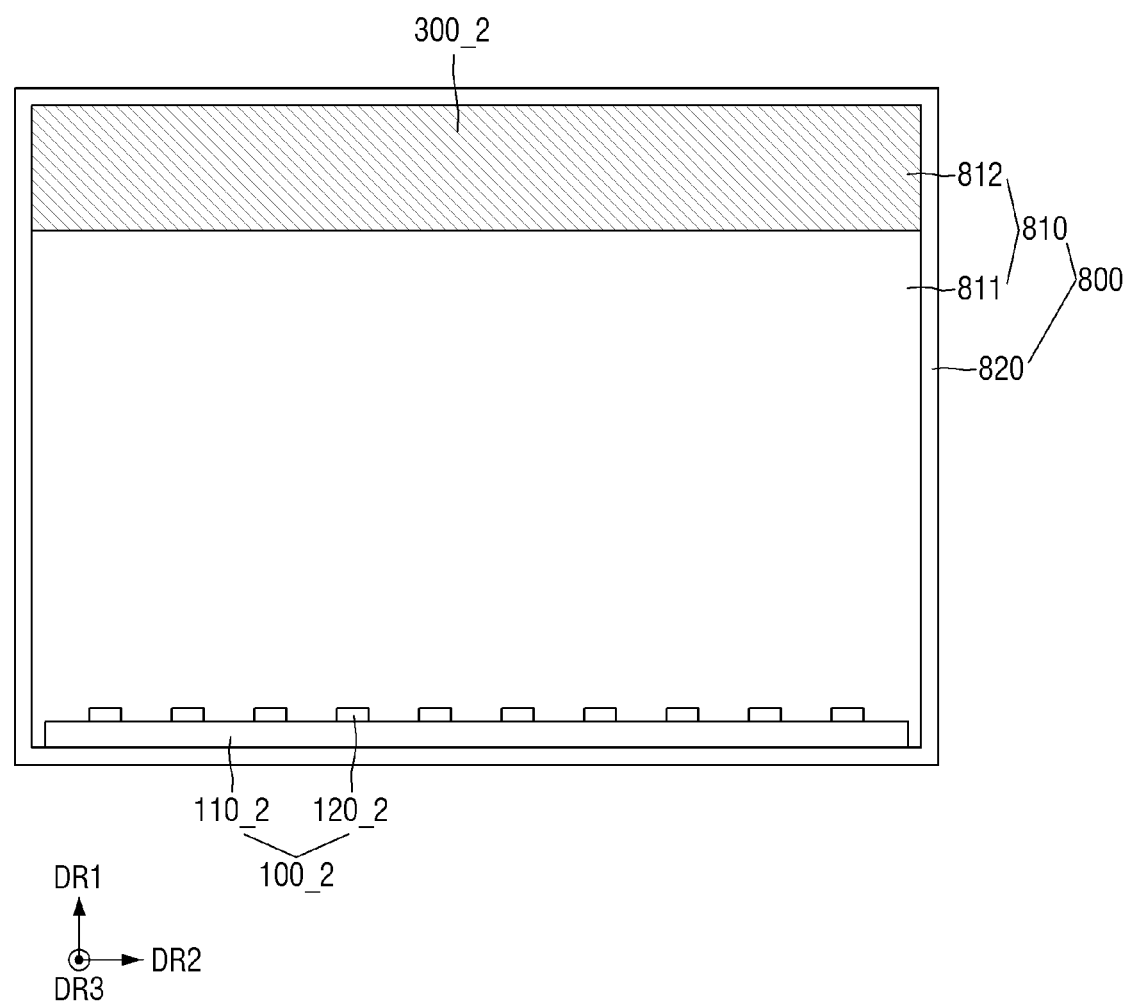
FIG. 10 is a plan view illustrating an exemplary relative arrangement of a light source member, a bottom chassis and a light correction material layer of the backlight unit of FIG. 9.
Figure 11:
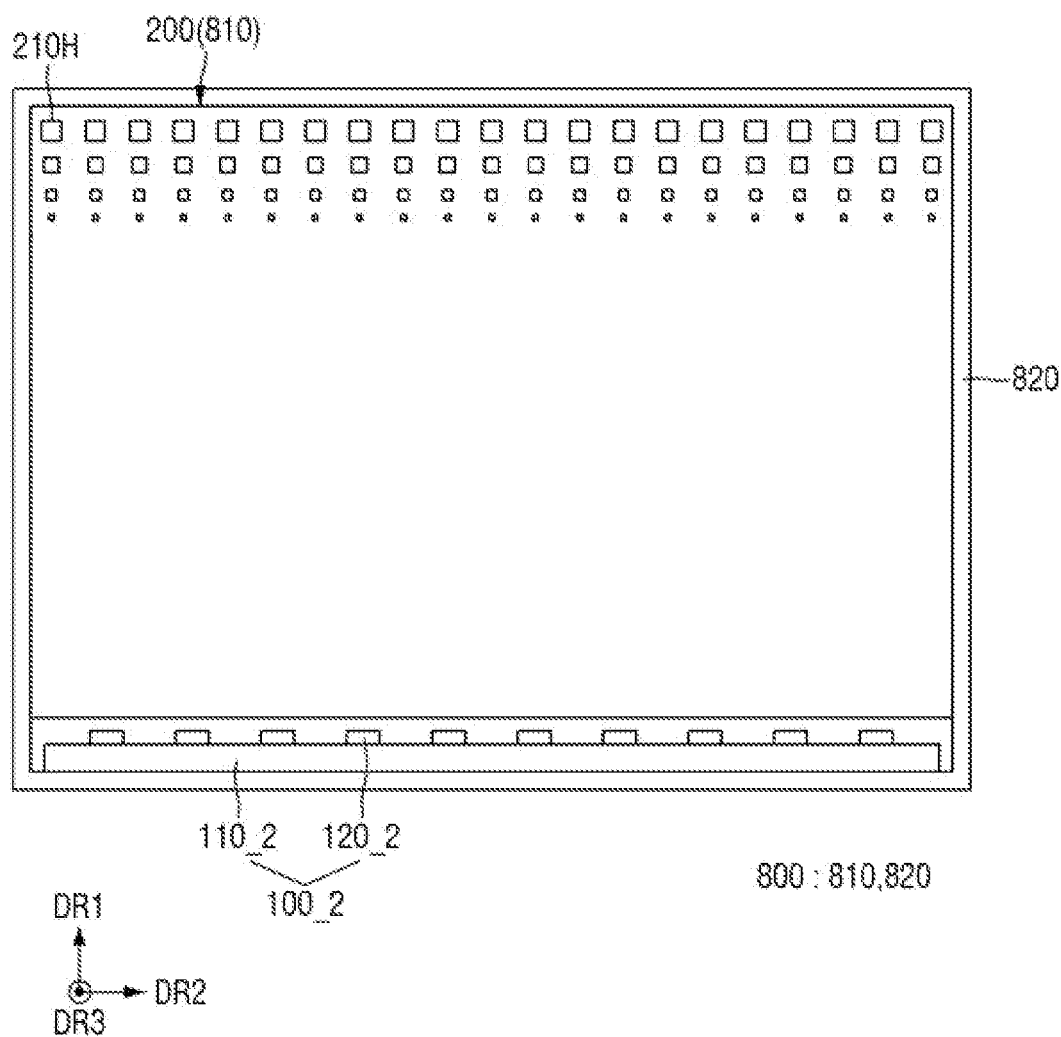
FIG. 11 is a plan view illustrating relative arrangement of a light source member, a bottom chassis and a reflective layer of the backlight unit of FIG. 9 according to an exemplary embodiment.
Figure 12:
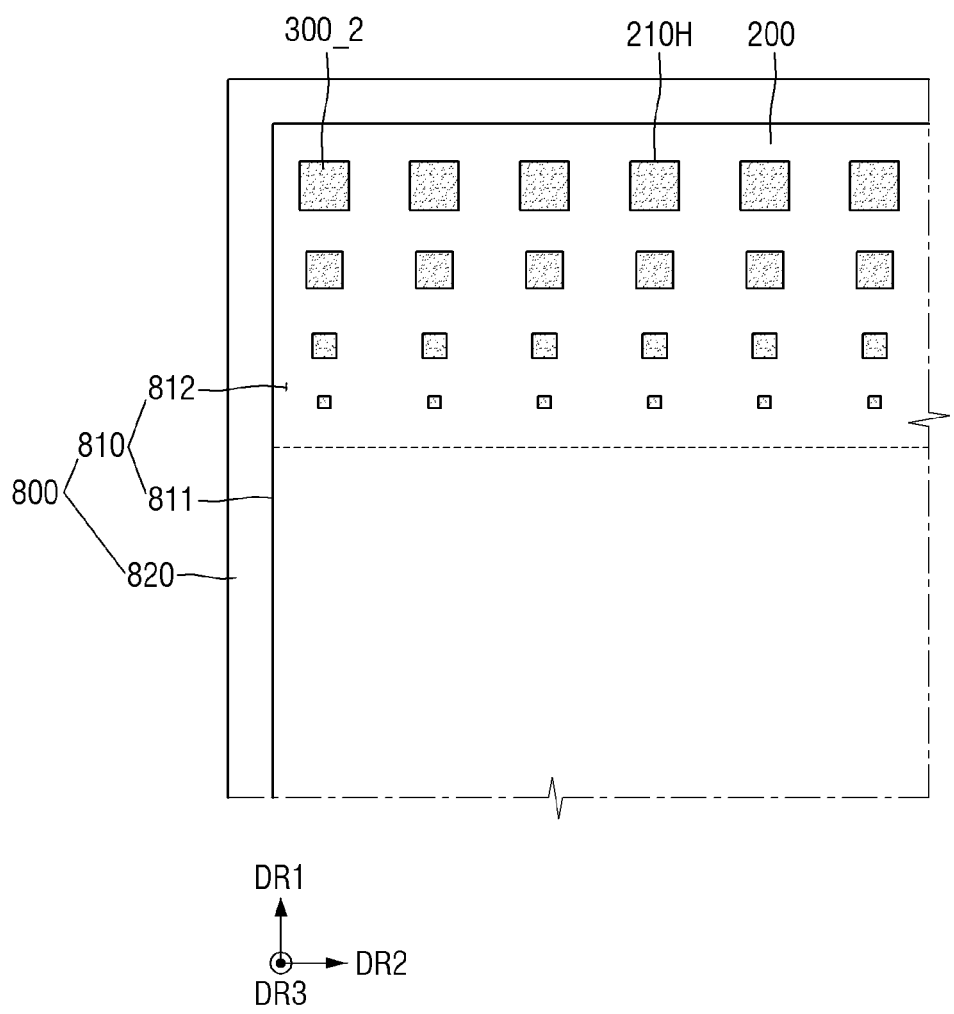
FIG. 12 is a plan view illustrating a reflective layer, a bottom chassis and a light correction material layer of the backlight unit of FIG. 9.
Figure 13:
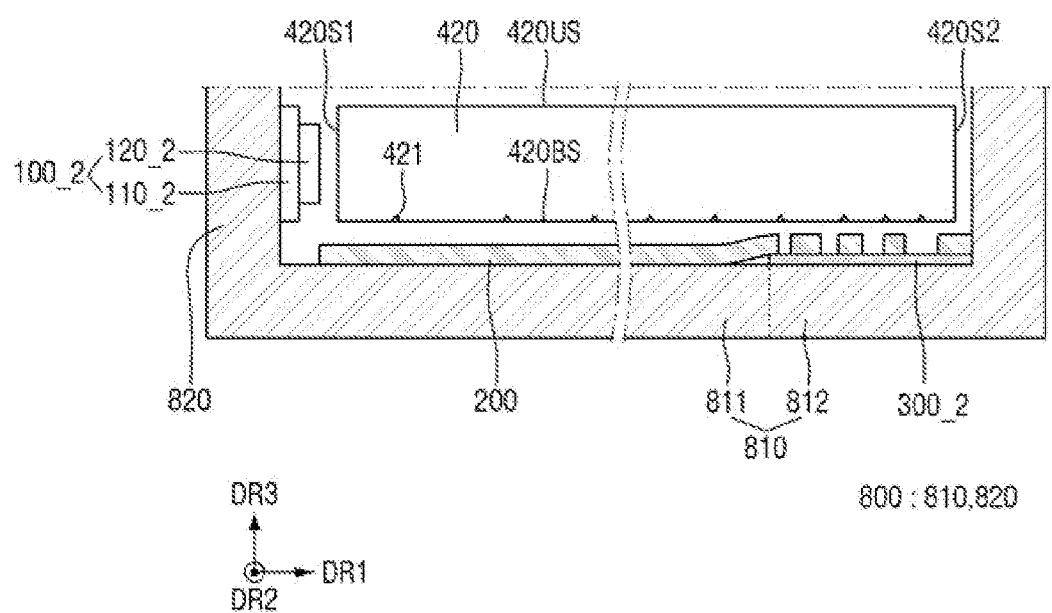
FIG. 13 is a cross-sectional view illustrating a light source member, a light guide plate, a reflective layer, a light correction material layer and a bottom chassis of the backlight unit of FIG. 9.

FIG. 9 is an exploded perspective view of a backlight unit according to an alternative exemplary embodiment. FIG. 10 is a plan view illustrating an exemplary relative arrangement of a light source member, a bottom chassis and a light correction material layer of the backlight unit of FIG. 9. FIG. 11 is a plan view illustrating relative arrangement of a light source member, a bottom chassis and a reflective layer of the backlight unit of FIG. 9 according to an exemplary embodiment. FIG. 12 is a plan view illustrating a reflective layer, a bottom chassis, and a light correction material layer of the backlight unit of FIG. 9. FIG. 13 is a cross-sectional view illustrating a light source member, a light guide plate, a reflective layer, a light correction material layer, and a bottom chassis of the backlight unit of FIG. 9.

Referring to FIGS. 9 to 13, an exemplary embodiment of a backlight unit 10_1 may include a light source member 100_2, a reflective layer 200, a light correction material layer 300, a light guide plate 420, a wavelength conversion layer 500, an optical sheet 600, and a bottom chassis 800 for accommodating the above-mentioned elements.

The light guide plate 420 serves to guide light to travel along a light propagation path. The light guide plate 420 may generally have a polygonal prism shape. The planar shape of the light guide plate 420 may be a rectangle having short sides in the first direction DR1 and long sides in the second direction DR2, but is not limited thereto. In an exemplary embodiment, the light guide plate 420 may have a quadrangular prism whose planar shape is substantially rectangular, and may include an upper surface 420US, a lower surface 420BS, and four side surfaces 420S, i.e., 420S1, 420S2, 420S3 and 420S4. In the detailed description and the accompanying drawings, reference symbols "420S1," "420S2," "420S3" and "420S4" are used to distinguish the four side surfaces, and reference symbol "420S" is used to simply refer to one side surface.

In an exemplary embodiment, each of the upper surface 420US and the lower surface 420BS of the light guide plate 420 may be located on a plane, and the plane where the upper surface 420US is located and the plane where the lower surface 420BS is located may be substantially parallel to each other. The light guide plate 420 may have an entirely uniform thickness. However, the disclosure is not limited thereto, and alternatively, the upper surface 420US or the lower surface 420BS may be formed by a plurality of planes, or the plane where the upper surface 420US is located may intersect the plane where the lower surface 420BS is located.

In one exemplary embodiment, for example, where the light guide plate 420 is a wedge-shaped light guide plate, the thickness of the light guide plate may become smaller as it goes from one side surface (e.g., a light incident surface) to the other side surface (e.g., a light facing surface) opposite thereto. In an alternative exemplary embodiment, the light guide plate 420 may have a shape in which as it goes toward the other side surface (e.g., the light facing surface) opposite thereto, the lower surface 420BS is inclined upward to a specific point near one side surface (e.g., the light incident surface) such that the thickness thereof decreases, and after the specific point, the upper surface 420US and the lower surface 420BS become flat.

The plane where the upper surface 420US is located and/or the plane where the lower surface 420BS is located may form an angle of about 90° with the plane where each side surface 420S is located. In one exemplary embodiment, for example, the light guide plate 420 may include an inclined surface between the upper surface 420US and each side surface 420S and/or between the lower surface 420BS and each side surface 420S. In such an embodiment, the light guide plate 420 may include a chamfer formed by cutting each corner. The chamfer may serve to alleviate the sharpness of a corner portion of the light guide plate 420 to prevent breakage due to an external impact. Hereinafter, for convenience of description, an exemplary embodiment where the upper surface and the side surface meet directly without an inclined surface and have an angle of 90° will be described in detail, but the disclosure is not limited thereto.

In an exemplary embodiment, the light source member 100_2 of the backlight unit 10_2 may be disposed adjacent to at least one side surface 420S of the light guide plate 420. wherein an exemplary embodiment, as shown in FIG. 9, a plurality of light sources 120_2 (e.g., LED package) disposed on the substrate 110_2 may be disposed adjacent to the side surface 420S1 located at one long side of the light guide plate 420, but the disclosure is not limited thereto. In one alternative exemplary embodiment, for example, the plurality of light sources 120_2 may be disposed adjacent to each of the side surfaces 420S1 and 420S2 of both long sides, or may be disposed adjacent to the side surfaces 420S3 and 420S4 of both short sides or one short side. In an exemplary embodiment, as shown in FIG. 9, the side surface 420S1 of one long side of the light guide plate 420 at which the light sources 120_2 are disposed adjacent to each other becomes the light incident surface (denoted as "420S1" in the drawing for convenience of description) on which light of the light sources 120_2 is directly incident, and the side surface 420S2 of the other long side opposite thereto becomes the light facing surface (denoted as "420S2" in the drawing for convenience of description).

The light source member 100_2 may include a substrate 110_2 and a plurality of light sources 120_2 disposed on the substrate 110_2. The light sources 120_2 may be an LED package, but is not limited thereto. In an exemplary embodiment, the light source 120_2 may emit blue light. In such an embodiment, the light emitted from the light source 120_2 may be light in a blue wavelength range. The light in a first wavelength range emitted from the light source 120_2 may be incident into the light guide plate 420 through the light incident surface 420S1 of the light guide plate 420.

In a plan view, a direction parallel to the light incident surface 420S1 and the light facing surface 420S2 is the second direction DR2, and a direction perpendicular to the light incident surface 420S1 and the light facing surface 420S2 is the first direction DR1. In one exemplary embodiment, for example, a direction from the light incident surface 420S1 to the light facing surface 420S2 may be the first direction DR1.

The light guide plate 420 may include an inorganic material. In one exemplary embodiment, for example, the light guide plate 420 may include or be made of glass, but is not limited thereto. Alternatively, the light guide plate 420 may include an organic material. In one exemplary embodiment, for example, the light guide plate 420 may include or be made of polymethyl methacrylate ("PMMA").

Light emitted from the light source 120_2 and incident on the light incident surface 420S1 of the light guide plate 420 may be guided from the light incident surface 420S1 to the light facing surface 420S2 by the light guide plate 420. In such an embodiment, total internal reflection may occur at the upper surface 420US and the lower surface 420BS of the light guide plate 420 to guide the incident light. One of the conditions under which total internal reflection may occur in the light guide plate 420 is that the refractive index of the light guide plate 420 is greater than the refractive index of a medium forming an optical interface therewith. As the refractive index of the medium forming the optical interface with the light guide plate 420 decreases, the total internal reflection may increase due to a decrease in critical angle for total reflection.

A scattering pattern 421 may be disposed on the lower surface 420BS of the light guide plate 420. The scattering pattern 421 serves to emit the light to the outside of the light guide plate 420 by changing a traveling angle of the light traveling by total reflection inside the light guide plate 420.

The scattering pattern 421 may be provided as a separate layer or pattern. In one exemplary embodiment, for example, a printing pattern or a pattern layer including a protruding pattern and/or a concave groove pattern may be provided or formed on the lower surface 420BS of the light guide plate 420 to function as the scattering pattern 421.

The scattering pattern 421 may be defined by a surface portion of the light guide plate 420 itself. In one exemplary embodiment, for example, a concave groove may be formed in the lower surface 420BS of the light guide plate 420 to function as the scattering pattern 421.

The arrangement density of the scattering patterns 421 may differ depending on the area. In one exemplary embodiment, for example, the scattering patterns 421 in an area adjacent to the light incident surface 420S1 to which a relatively large amount of light travels may have a smaller arrangement density, and the scattering patterns 421 in an area adjacent to the light facing surface 420S2 to which a relatively small amount of light travels may have a larger arrangement density.

The reflective layer 200 may be disposed below the light guide plate 420. The reflective layer 200 may be disposed to overlap the light guide plate 420 in the third direction DR3. The reflective layer 200 may be disposed not to overlap the light source member 100_2 in the third direction DR3. The reflective layer 200 may be disposed below the light guide plate 420 to reflect at least a portion of the light, which passes through the light guide plate 420 and travels toward the reflective layer 200, back to the light guide plate 420.

The reflective layer 200 may be provided with a plurality of opening patterns 210H. The plurality of opening patterns 210H may be defined or formed through the reflective layer 200. The opening patterns 210H may be spaced apart from each other.

The wavelength conversion layer 500 may be disposed on the light guide plate 420. The wavelength conversion layer 500 serves to convert the wavelength of at least a portion of light emitted from the light guide plate 420 toward the display panel 70.

The optical sheet 600 may be disposed on the wavelength conversion layer 500.

The bottom chassis 800 may serve to accommodate the elements or layers of the backlight unit 10_1 described above.

The bottom chassis 800 is open at a side thereof and includes a bottom portion 810 and a sidewall 820 connected to the bottom portion 810. In a space defined by the bottom portion 810 and the sidewall 820 of the bottom chassis 800, a light correction material layer 300_2, the reflective layer 200, the light guide plate 420 and the light source member 100_2, the wavelength conversion layer 500, and the optical sheet 600 may be sequentially disposed on the bottom portion 810.

The light source member 100_1 may be fixed to the sidewall 820 of the bottom chassis 800 by using a separate coupling member.

Hereinafter, the relative arrangement of the bottom portion 810, the light correction material layer 300_2 and the reflective layer 200 of the backlight unit 10_2 illustrated in FIG. 9 will be described in detail with reference to FIGS. 10 to 13.

The bottom portion 810 may include a central portion 811 and a peripheral portion 812. The peripheral portion 812 may be disposed on one side of the central portion 811 in the first direction DR1. The peripheral portion 812 may be an area adjacent to the sidewall 820 opposite to the sidewall 820 which faces the light source member 100_2. The area of the peripheral portion 812 may be smaller than the area of the central portion 811 in a plan view.

The reflective layer 200 may be disposed on the bottom portion 810. The reflective layer 200 may be disposed on the central portion 811 and the peripheral portion 812 of the bottom portion 810. The reflective layer 200 may expose a portion of the central portion 811 in the third direction DR3. The reflective layer 200 may not overlap the light source member 100_2 in the third direction DR3.

A plurality of opening patterns 210H may be defined or formed at one side of the reflective layer 200 in the first direction DR1. The plurality of opening patterns 210H may be defined or formed in the reflective layer 200 disposed on the peripheral portion 812. The plurality of opening patterns 210H may be defined or formed in an area adjacent to the sidewall facing the sidewall 820 on which the light source member 110_2 is fixed.

The plurality of opening patterns 210H may be spaced apart from each other. The arrangement density of the opening patterns 210H may increase along the first direction DR1. The first direction DR1 may be a direction in which the light facing surface 420S2 faces from the light incident surface 420S1. The density of the light correction material layer 300_2 exposed by the reflective layer 200 may be adjusted by adjusting the arrangement density of the plurality of opening patterns 210H.

The planar areas of the plurality of opening patterns 210H may be different from each other. In one exemplary embodiment, for example, the planar area of each opening pattern 210H may increase as moving toward the one side of the reflective layer 200 in the first direction DR1.

The light correction material layer 300_2 may be interposed between the peripheral portion 812 and the reflective layer 200. The light correction material layer 300_2 may be disposed on the upper surface of the peripheral portion 812. The light correction material layer 300_2 may be disposed entirely on the upper surface of the peripheral portion 812. The light correction material layer 300_2 may not overlap the light source member 100_2 in the thickness direction.

The light correction material layer 300_2 may include an upper surface and a lower surface. The upper surface of the light correction material layer 300_2 may be in contact with the lower surface of the reflective layer 200, and the lower surface of the light correction material layer 300_2 may be in contact with the upper surface of the peripheral portion 812.

At least a portion of the light correction material layer 300_2 may be exposed in the third direction DR3 by the plurality of opening patterns 210H. The planar area of the light correction material layer 300_2 exposed by the plurality of opening patterns 210H may increase as moving toward the one side of the reflective layer 200 in the first direction DR1.

In an exemplary embodiment of the backlight unit, the light correction material layer 300_2 may be applied to an area adjacent to the other side opposite to one side adjacent to the light source member 100_2. The area of the light correction material layer 300_2 exposed in the third direction DR3 may be adjusted by the arrangement density of the plurality of opening patterns 210H defined or formed through the reflective layer 200 disposed on the light correction material layer 300_2. Therefore, by adjusting the arrangement density of the light correction material layer 300_2 using the opening patterns 210H of the reflective layer 200, since re-design of the arrangement density of the light correction material layer 300_2 according to the material of the reflective layer 200 in the manufacturing process may be omitted, the manufacturing process efficiency may be increased.

Figure 14:
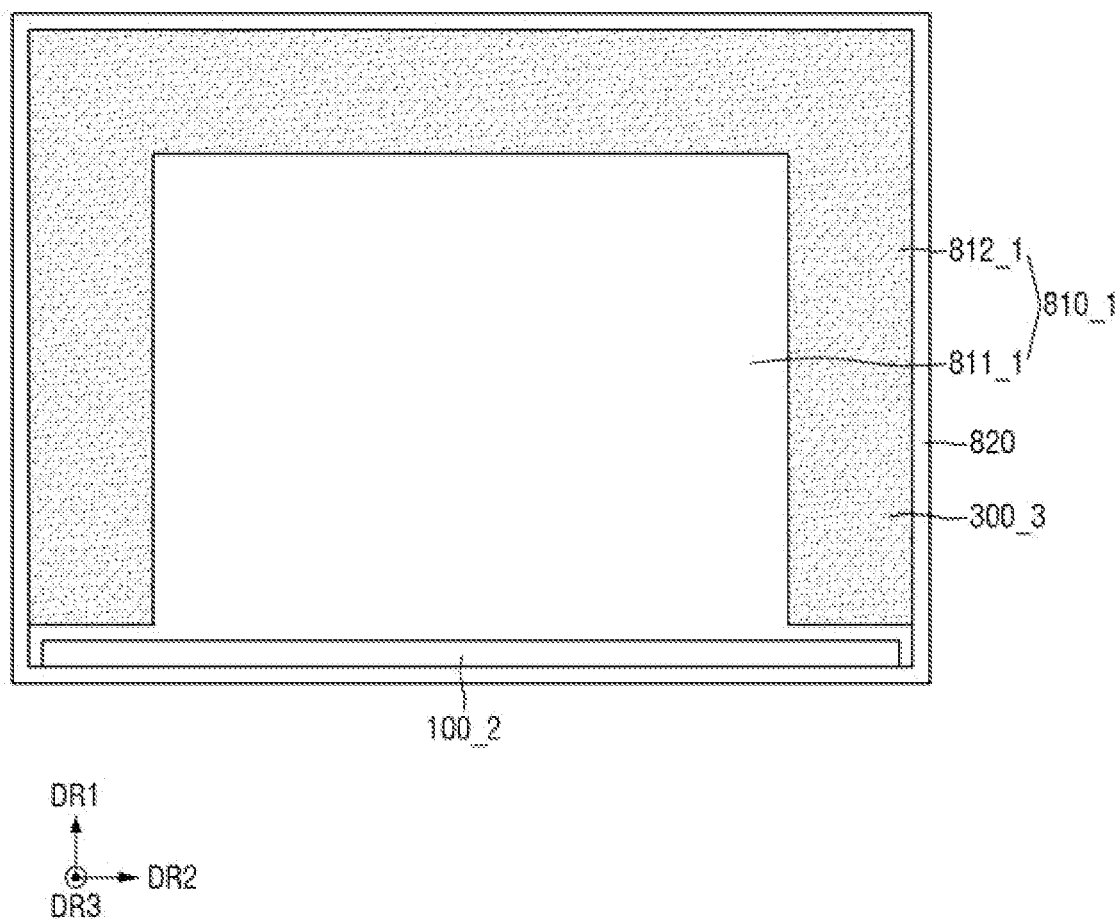
FIG. 14 is a plan view illustrating relative arrangement of a light source member, a bottom chassis and a light correction material layer of the backlight unit of FIG. 9 according to an alternative exemplary embodiment.
Figure 15:
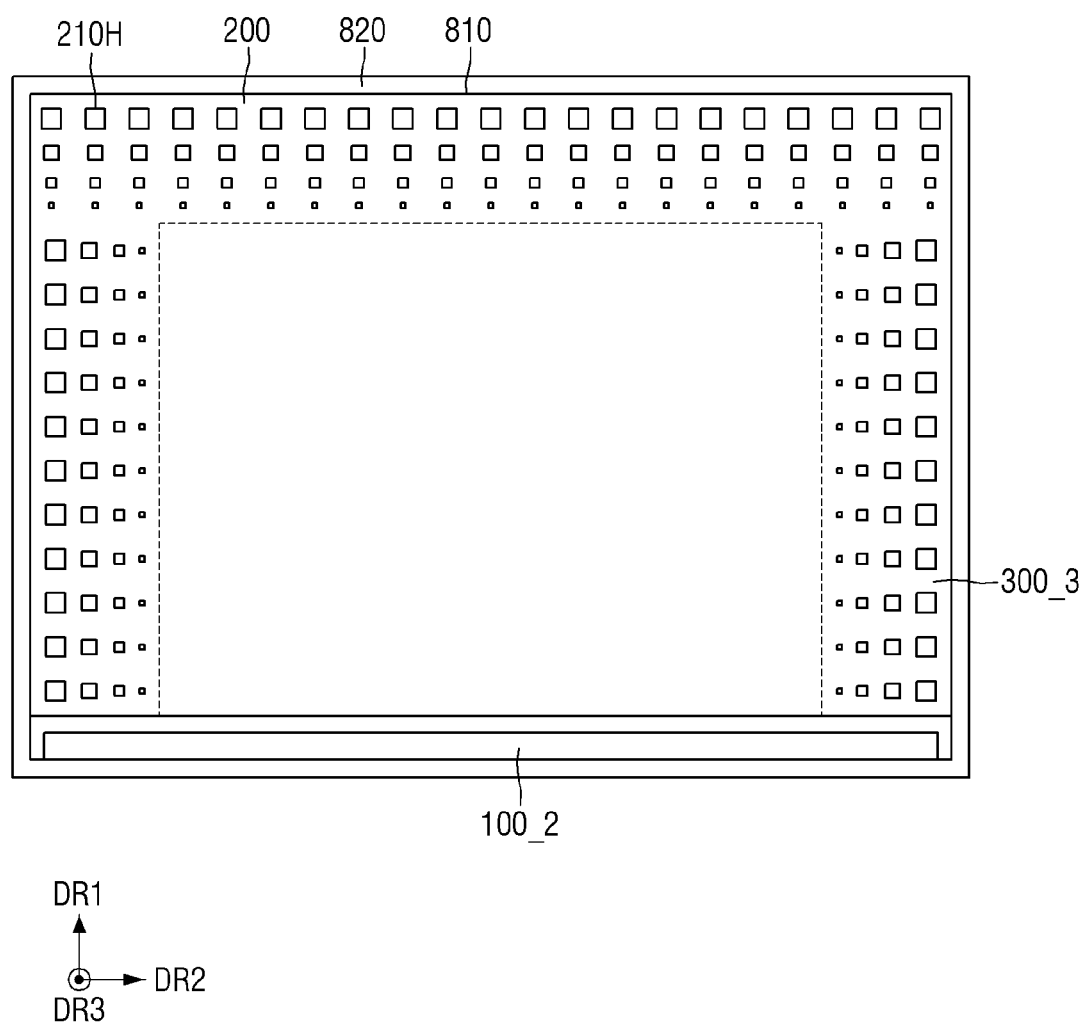
FIG. 15 is a plan view illustrating relative arrangement of a light source member, a bottom chassis and a reflective layer of the backlight unit of FIG. 9 according to an alternative exemplary embodiment.

FIG. 14 is a plan view illustrating relative arrangement of a light source member, a bottom chassis and a light correction material layer of the backlight unit of FIG. 9 according to an alternative exemplary embodiment. FIG. 15 is a plan view illustrating relative arrangement of a light source member, a bottom chassis and a reflective layer of the backlight unit of FIG. 9 according to an alternative exemplary embodiment.

Referring to FIGS. 14 and 15, in an exemplary embodiment, a bottom portion 810_1 may include a central portion 811_1 and a peripheral portion 812_1. In such an embodiment, the peripheral portion 812_1 may be disposed outside the central portion 811_1, and may be disposed on the upper, right and left sides of the central portion 811_1.

A light correction material layer 300_3 may be disposed entirely on the upper surface of the peripheral portion 812_1. Thus, the light correction material layer 300_3 may be disposed on the upper, right and left sides of the bottom portion 810_1 in a plan view. The light correction material layer 300_3 may not be disposed below the bottom portion 810_1 overlapping the light source member 100_2.

The plurality of opening patterns 210H may be disposed on the peripheral portion 812_1. The opening patterns 210H may be defined or formed at upper, right and left edges of the reflective layer 200.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A backlight unit including a central area and a peripheral area disposed outside the central area, the backlight unit comprising:
a bottom chassis;
a plurality of light sources disposed on a surface of the bottom chassis;
a reflective layer disposed on the surface of the bottom chassis, wherein a plurality of light source insertion holes and a plurality of opening patterns are defined through the reflective layer; and
a light correction material layer disposed between the bottom chassis and the reflective layer in the peripheral area,
wherein the light source insertion holes expose the light sources, respectively,
wherein the opening patterns are disposed in the peripheral area to expose at least a portion of the light correction material layer in a thickness direction,
wherein each of the light sources emits light in a first wavelength range, and
wherein the light correction material layer includes a material which primarily absorbs the light in the first wavelength range or a material which converts light of the first wavelength range into light in a second wavelength range different from the first wavelength range.

2. The backlight unit of claim 1,
wherein the opening patterns are spaced apart from each other, and
wherein an arrangement density of the opening patterns decreases in a direction from the peripheral area toward the central area.

3. The backlight unit of claim 2,
wherein a planar area of each of the opening patterns decreases in the direction from the peripheral area toward the central area, and
wherein a planar area of the light correction material layer exposed by the opening patterns decreases in the direction from the peripheral area toward the central area.

4. The backlight unit of claim 1,
wherein the light source emits blue light, and
wherein the light correction material layer includes a material which converts the blue light into yellow light.

5. The backlight unit of claim 1, wherein the opening patterns and the light source insertion holes are spaced apart from each other.

6. The backlight unit of claim 1,
wherein each of the light source insertion holes surrounds a corresponding light source of the light sources, and
wherein a thickness of the reflective layer is smaller than a thickness of the light sources.

7. The backlight unit of claim 1,
wherein the light source insertion holes include a first light source insertion hole disposed in the peripheral area, and a second light source insertion hole disposed in the central area, and
wherein the first light source insertion hole exposes at least a portion of the light correction material layer.

8. The backlight unit of claim 1, further comprising:
a substrate disposed between the bottom chassis and the reflective layer,
wherein the substrate includes a first surface facing the reflective layer and a second surface opposite to the first surface, and wherein the light sources are disposed on the first surface of the substrate.

9. The backlight unit of claim 8, wherein the light correction material layer is disposed on a portion of the first surface of the substrate which is exposed by the light sources in the peripheral area.

10. The backlight unit of claim 9, wherein the light correction material layer does not overlap the light sources in a plan view.

11. A backlight unit including a central area and a peripheral area disposed outside the central area, the backlight unit comprising:
a bottom chassis;
a plurality of light sources disposed on a surface of the bottom chassis;
a reflective layer disposed on the surface of the bottom chassis, wherein a plurality of light source insertion holes and a plurality of opening patterns are defined through the reflective layer;
a light correction material layer disposed between the bottom chassis and the reflective layer in the peripheral area; and
a substrate disposed between the bottom chassis and the reflective layer,
wherein the light source insertion holes expose the light sources, respectively,
wherein the opening patterns are disposed in the peripheral area to expose at least a portion of the light correction material layer in a thickness direction,
wherein the substrate includes a first surface facing the reflective layer and a second surface opposite to the first surface,
wherein the light sources are disposed on the first surface of the substrate,
wherein the light correction material layer is interposed between the bottom chassis and the substrate, and
wherein the substrate includes a light transmissive material.

12. The backlight unit of claim 11, wherein the light sources disposed in the peripheral area overlap at least a portion of the light correction material layer in the plan view.

13. The backlight unit of claim 1, further comprising:
a diffusion plate spaced apart from the light sources in a thickness direction on the surface of the bottom chassis.

14. A display device comprising:
a backlight unit including a central area and a peripheral area surrounding the central area, the backlight unit comprising:
a bottom chassis,
a light correction material layer disposed on a surface of the bottom chassis in the peripheral area,
a plurality of light sources disposed on the surface of the bottom chassis, and
a reflective layer disposed on the light correction material layer, wherein a plurality of light source insertion holes and a plurality of opening patterns spaced apart from the light source insertion holes are defined through the reflective layer; and
a display panel disposed above the backlight unit,
wherein the light source insertion holes expose the light sources, respectively,
wherein the opening patterns are disposed in the peripheral area to expose at least a portion of the light correction material layer in a thickness direction,
wherein each of the light sources emits light in a first wavelength range, and
wherein the light correction material layer includes a material which primarily absorbs the light in the first wavelength range or a material which converts light of the first wavelength range into light in a second wavelength range different from the first wavelength range.

15. The display device of claim 14,
wherein the opening patterns are spaced apart from each other, and
wherein an arrangement density of the opening patterns decreases in a direction from the peripheral area toward the central area.

16. The display device of claim 14,
wherein the light source emits blue light, and
wherein the light correction material layer includes a material which converts the blue light into yellow light.

17. The display device of claim 14, wherein
each of the light source insertion holes surrounds a corresponding light source of the light sources, and
wherein a thickness of the reflective layer is smaller than a thickness of the light sources.

* * * * *